US012632767B2

(12) United States Patent
Schmitz et al.

(10) Patent No.: US 12,632,767 B2
(45) Date of Patent: May 19, 2026

(54) METHOD AND APPARATUS FOR QUANTUM-CLASSICAL RESOURCE BALANCING OPTIMIZATIONS

(71) Applicant: Intel Corporation, Santa Clara, CA (US)

(72) Inventors: Albert Schmitz, Beaverton, OR (US); Shavindra Premaratne, Portland, OR (US); Anne Matsuura, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 18/539,044

(22) Filed: Dec. 13, 2023

(65) Prior Publication Data

US 2025/0200416 A1    Jun. 19, 2025

(51) Int. Cl.
*G06N 10/60*          (2022.01)
(52) U.S. Cl.
CPC .................................... *G06N 10/60* (2022.01)
(58) Field of Classification Search
CPC .................................................... G06N 10/60
See application file for complete search history.

(56) References Cited

U.S. PATENT DOCUMENTS

| | | | | | |
|---|---|---|---|---|---|
| 11,436,519 | B1 * | 9/2022 | Dridi | ...................... | G06N 20/00 |
| 2019/0392343 | A1 * | 12/2019 | Haah | ...................... | G06N 10/20 |

| | | | | | |
|---|---|---|---|---|---|
| 2021/0064350 | A1 * | 3/2021 | Cao | .......................... | G06F 8/447 |
| 2021/0357229 | A1 * | 11/2021 | Gonciulea | .............. | G06N 10/60 |
| 2022/0101169 | A1 * | 3/2022 | Nam | ...................... | G06N 10/00 |
| 2022/0121979 | A1 * | 4/2022 | Gonthier | ................ | G06N 10/60 |
| 2023/0289638 | A1 * | 9/2023 | Peterson | ................ | G06N 10/20 |

(Continued)

OTHER PUBLICATIONS

Chong et al., "Programming Languages and Compiler Design for Realistic Quantum Hardware", Nature, vol. 549, Sep. 14, 2017, pp. 180-187.

(Continued)

*Primary Examiner* — Joseph D Torres
(74) *Attorney, Agent, or Firm* — NICHOLSON DE VOS WEBSTER & ELLIOTT LLP

(57)          ABSTRACT

An apparatus, method, and machine-readable medium are described for automated quantum-classical resource balancing optimizations. For example, one embodiment includes a machine-readable medium having program code stored thereon which, when executed by a machine, implements a plurality of functional components of a quantum compiler, comprising: quantum compiler logic to generate an intermediate quantum circuit representation based on hybrid quantum-classical source code designed for a hybrid quantum-classical system comprising a quantum computing component and a classical computing component; and optimization logic to analyze the intermediate quantum circuit representation and generate an optimized quantum circuit representation based, at least partly, on system-dependent parameters and configuration parameters, the system-dependent parameters associated with characteristics of the quantum computing component and the classical computing component and the configuration parameters to indicate user requirements.

21 Claims, 25 Drawing Sheets

(56) References Cited

U.S. PATENT DOCUMENTS

| | | | | |
|---|---|---|---|---|
| 2023/0367822 A1* | 11/2023 | Orus Lacort | .......... | G06N 10/20 |
| 2024/0193450 A1* | 6/2024 | Naveh | .................... | G06N 10/20 |
| 2024/0354628 A1* | 10/2024 | Kaushik | ................ | G06N 10/40 |

OTHER PUBLICATIONS

Fu et al., "A Heterogeneous Quantum Computer Architecture", Proceedings of the ACM International Conference on Computing Frontiers, May 2016, 9 pages.
Fu et al., "A Microarchitecture for a Superconducting Quantum Processor", IEEE Micro, vol. 38, No. 3, May/Jun. 2018, pp. 40-47.
Gidney, Craig, "Partially Erasing Entanglement: Measuring a GHZ Triplet into a Bell Pair", Available Online at <https://algassert.com/quantum/2015/09/02/Partially-Erasing-Entanglement-with-Measurement.html>, Sep. 2, 2015, 4 pages.
O'Malley et al., "Scalable Quantum Simulation of Molecular Energies", Physical Review X, vol. 6, No. 3, 2016, pp. 031007-1-031007-13.

\* cited by examiner

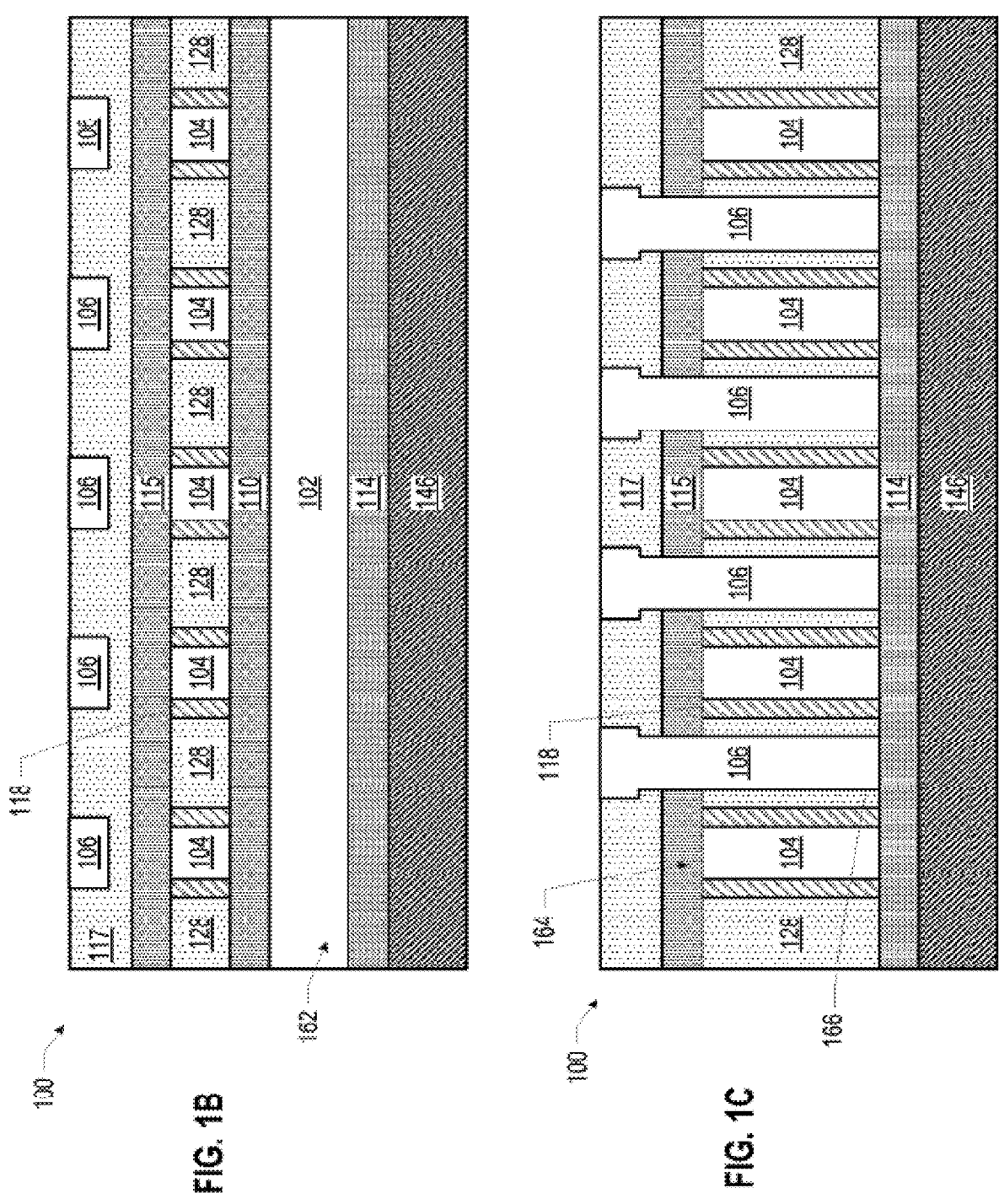

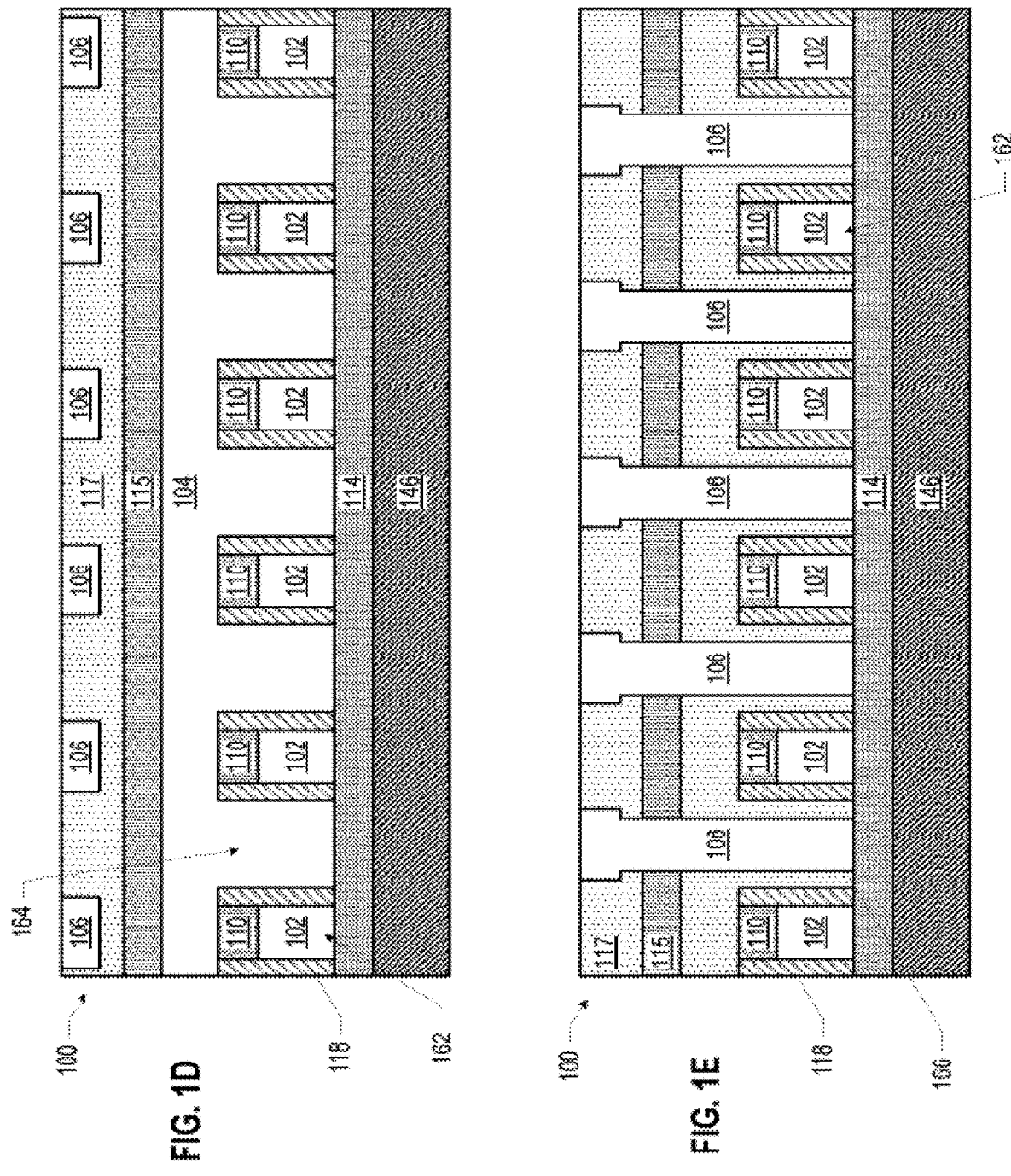

```
for k from 0 to NR-1 do
  for i from 0 to NQ-1 do
    h_x[i] ← random real number within [-1, 1]    # floating point op
    h_y[i] ← random real number within [-1, 1]    # floating point op
    a[i]  ← 0
  end for
  for j from 0 to NP-1 do
    for i from 0 to NQ-1 do
      Initialize(q[i])                  # quantum op, "Qu-Op Analog Signal Generator"
    end for
    prep params (h_x, h_y, ...)         # floating point op
    for i from 0 to NT-1 do
      Q(params)         # Figure 3, "Quantum circuit for many-body disordered Hamiltonian"
    end for
    for i from 0 to NQ-1 do
      a[i] ← a[i] + Measure(q[i])       # quantum op, "Qubit measurement"
    end for
  end for
  for i from 0 to NQ-1 do
    Pr[i] ← a[i] / NP;                  # floating point op
  end for
  compute system properties from Pr.    # floating point op
end for
```

FIG. 5B

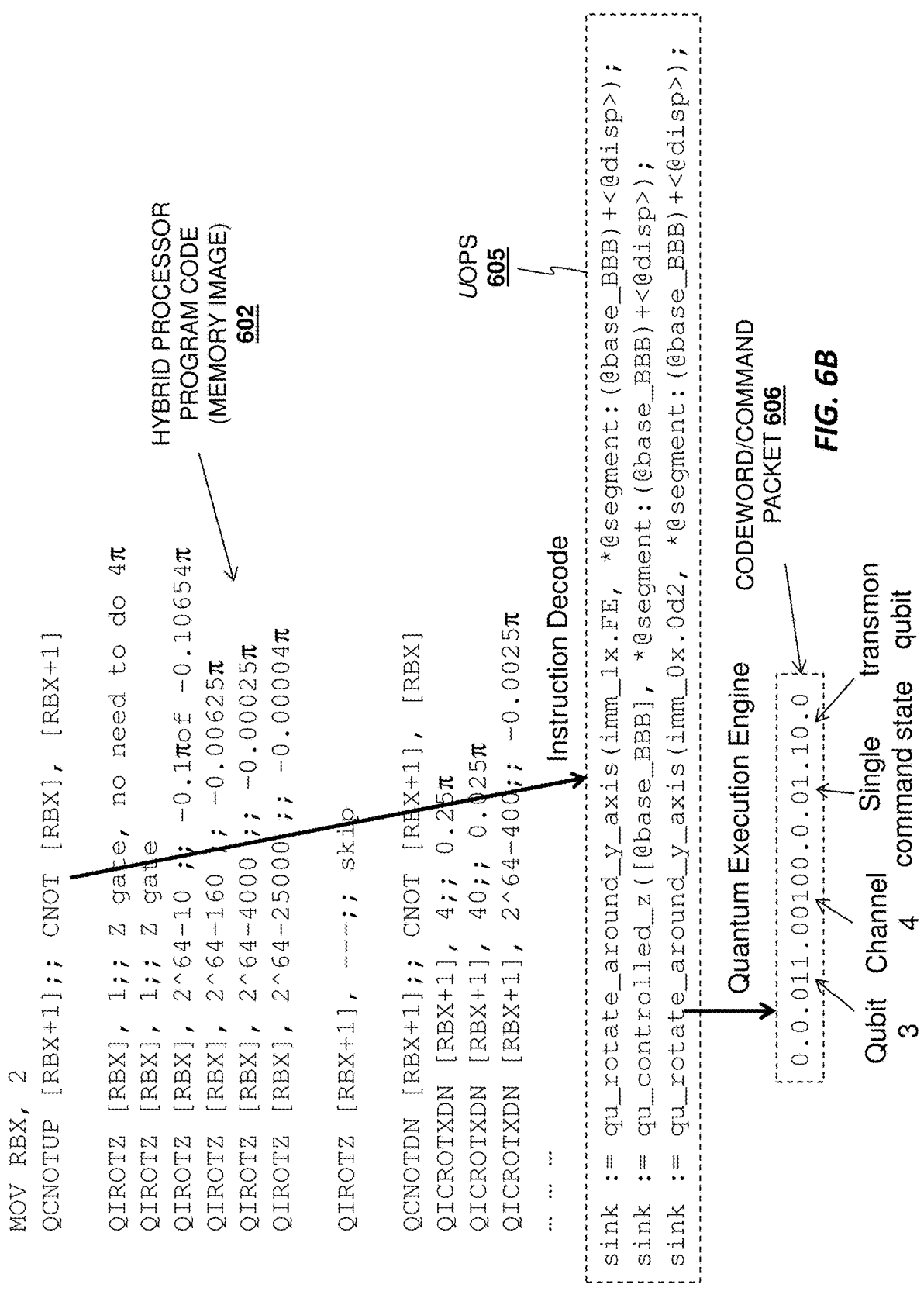

```
MOV RBX, 2
QCNOTUP [RBX+1];; CNOT [RBX], [RBX+1]

QIROTZ [RBX], 1;; Z gate, no need to do 4π
QIROTZ [RBX], 1;; Z gate
QIROTZ [RBX], 2^64-10 ;; -0.1πof -0.10654π
QIROTZ [RBX], 2^64-160 ; -0.00625π
QIROTZ [RBX], 2^64-4000 ;; -0.00025π
QIROTZ [RBX], 2^64-25000 ;; -0.00004π

QIROTZ [RBX+1], ---;; skip

QCNOTDN [RBX+1];; CNOT [RBX+1], [RBX]
QICROTXDN [RBX+1], 4;; 0.25π
QICROTXDN [RBX+1], 40;; 0.025π
QICROTXDN [RBX+1], 2^64-400;; -0.0025π
... ...
```

HYBRID PROCESSOR PROGRAM CODE (MEMORY IMAGE) 602

Instruction Decode

```
sink := qu_rotate_around_y_axis(imm_1x.FE, *@segment:(@base_BBB)+<@disp>);
sink := qu_controlled_z([@base_BBB], *@segment:(@base_BBB)+<@disp>);
sink := qu_rotate_around_y_axis(imm_0x.0d2, *@segment:(@base_BBB)+<@disp>);
```

UOPS 605

Quantum Execution Engine     CODEWORD/COMMAND PACKET 606

```
0.0.011.00100.0.01.10.0
```

Qubit   Channel   Single   transmon
  3        4      command   state  qubit

FIG. 6B

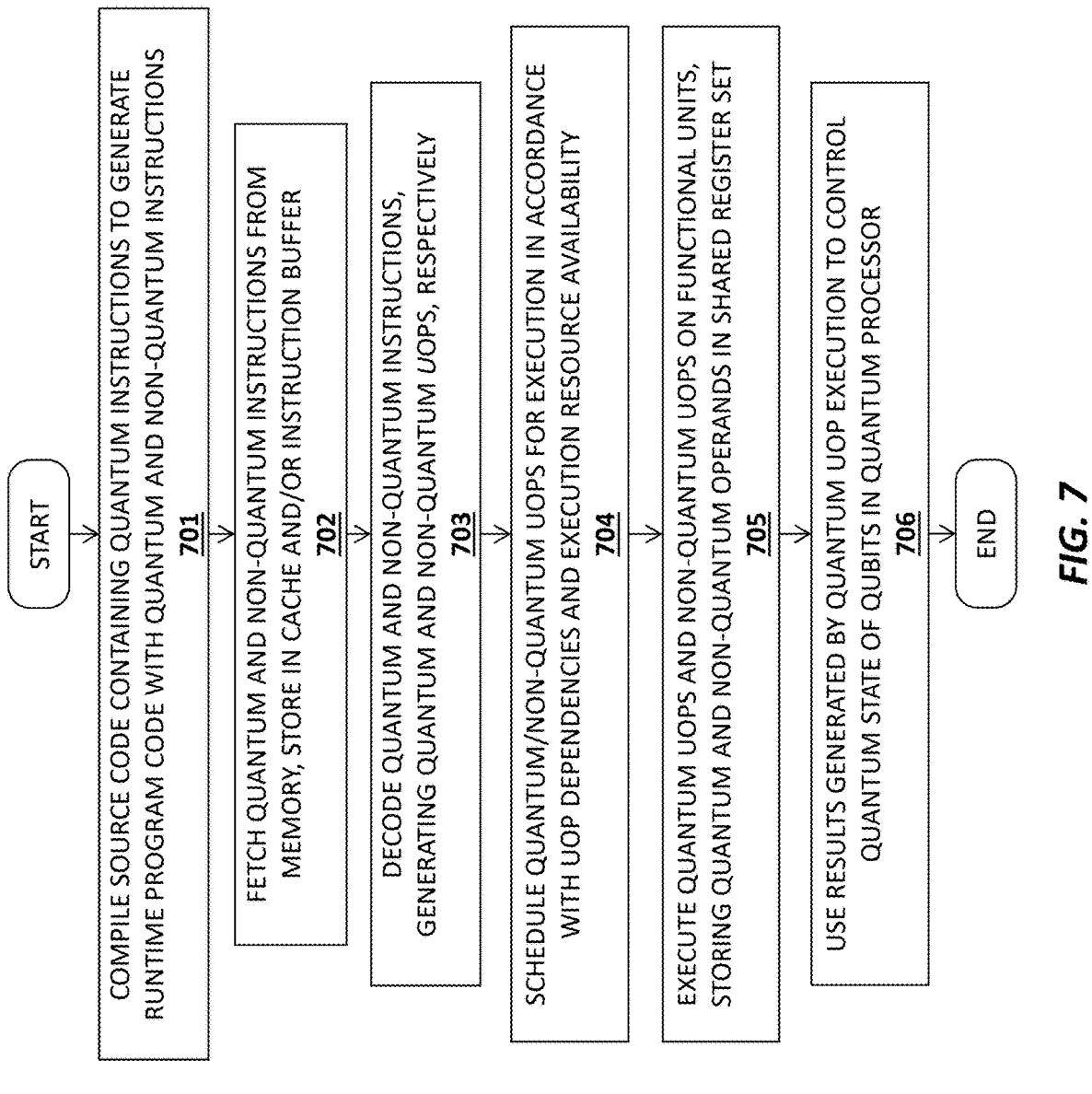

START

COMPILE SOURCE CODE CONTAINING QUANTUM INSTRUCTIONS TO GENERATE RUNTIME PROGRAM CODE WITH QUANTUM AND NON-QUANTUM INSTRUCTIONS
701

FETCH QUANTUM AND NON-QUANTUM INSTRUCTIONS FROM MEMORY, STORE IN CACHE AND/OR INSTRUCTION BUFFER
702

DECODE QUANTUM AND NON-QUANTUM INSTRUCTIONS, GENERATING QUANTUM AND NON-QUANTUM UOPS, RESPECTIVELY
703

SCHEDULE QUANTUM/NON-QUANTUM UOPS FOR EXECUTION IN ACCORDANCE WITH UOP DEPENDENCIES AND EXECUTION RESOURCE AVAILABILITY
704

EXECUTE QUANTUM UOPS AND NON-QUANTUM UOPS ON FUNCTIONAL UNITS, STORING QUANTUM AND NON-QUANTUM OPERANDS IN SHARED REGISTER SET
705

USE RESULTS GENERATED BY QUANTUM UOP EXECUTION TO CONTROL QUANTUM STATE OF QUBITS IN QUANTUM PROCESSOR
706

END

FIG. 7

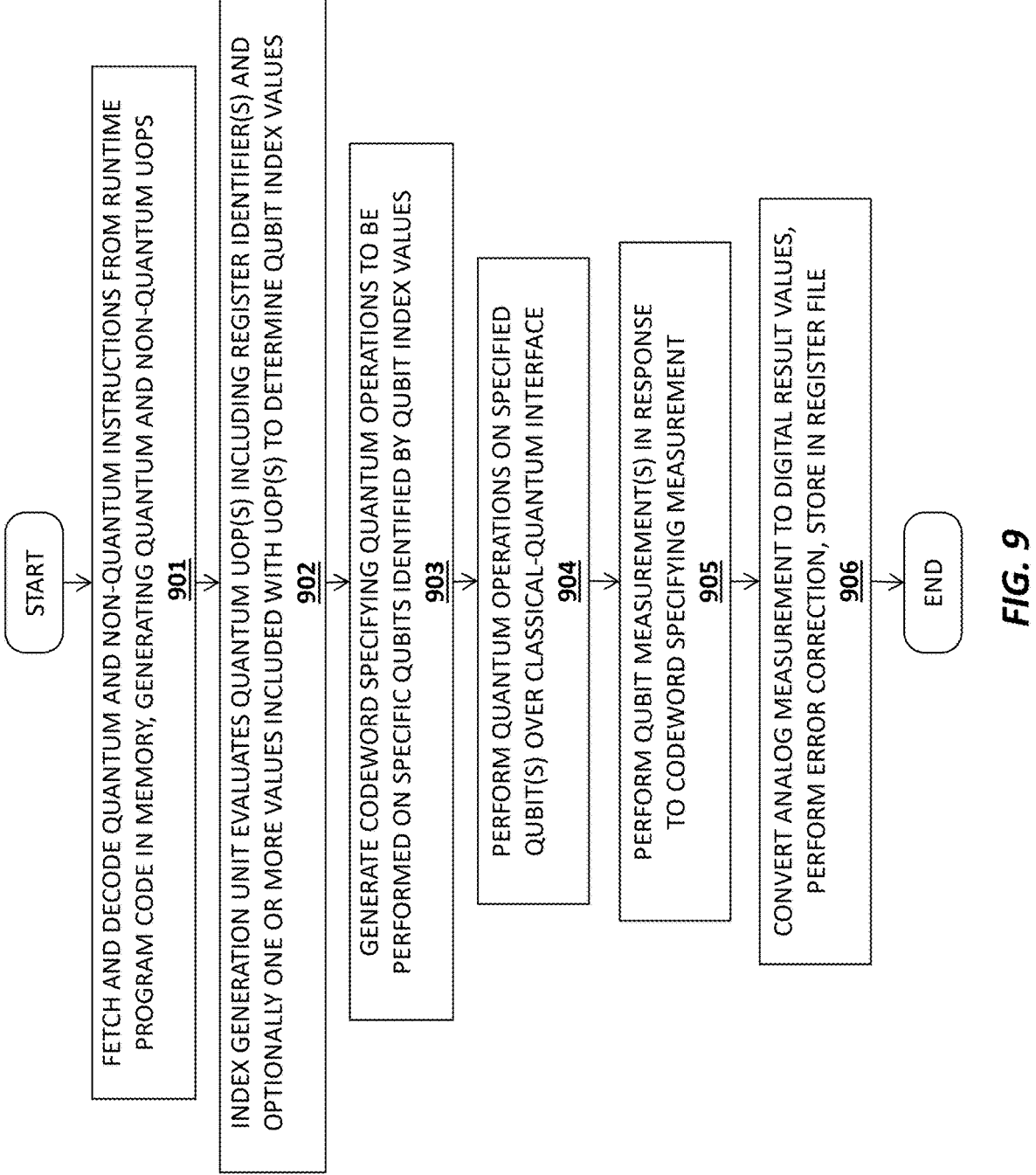

START

FETCH AND DECODE QUANTUM AND NON-QUANTUM INSTRUCTIONS FROM RUNTIME PROGRAM CODE IN MEMORY, GENERATING QUANTUM AND NON-QUANTUM UOPS
901

INDEX GENERATION UNIT EVALUATES QUANTUM UOP(S) INCLUDING REGISTER IDENTIFIER(S) AND OPTIONALLY ONE OR MORE VALUES INCLUDED WITH UOP(S) TO DETERMINE QUBIT INDEX VALUES
902

GENERATE CODEWORD SPECIFYING QUANTUM OPERATIONS TO BE PERFORMED ON SPECIFIC QUBITS IDENTIFIED BY QUBIT INDEX VALUES
903

PERFORM QUANTUM OPERATIONS ON SPECIFIED QUBIT(S) OVER CLASSICAL-QUANTUM INTERFACE
904

PERFORM QUBIT MEASUREMENT(S) IN RESPONSE TO CODEWORD SPECIFYING MEASUREMENT
905

CONVERT ANALOG MEASUREMENT TO DIGITAL RESULT VALUES, PERFORM ERROR CORRECTION, STORE IN REGISTER FILE
906

END

*FIG. 9*

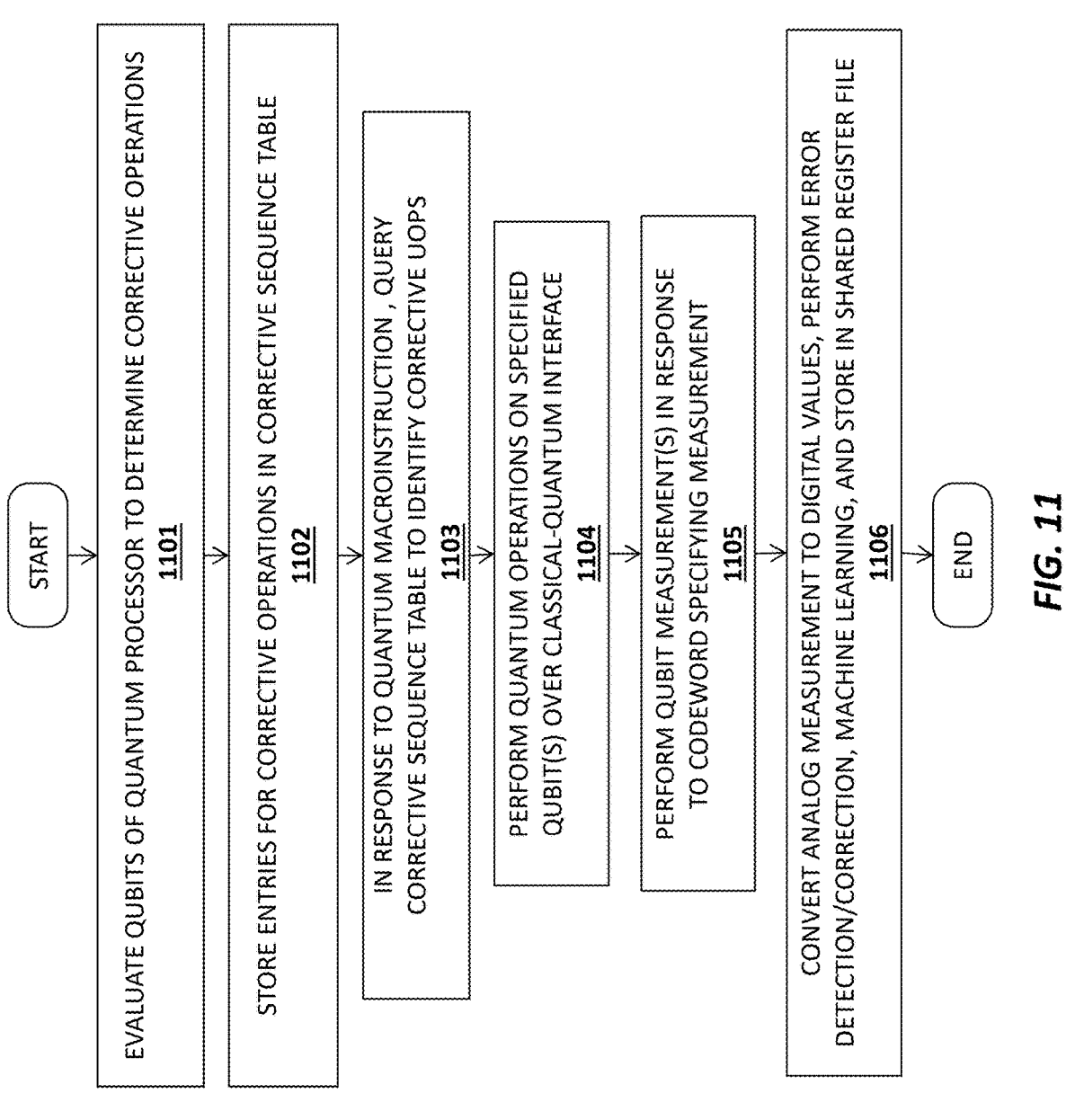

START

EVALUATE QUBITS OF QUANTUM PROCESSOR TO DETERMINE CORRECTIVE OPERATIONS
1101

STORE ENTRIES FOR CORRECTIVE OPERATIONS IN CORRECTIVE SEQUENCE TABLE
1102

IN RESPONSE TO QUANTUM MACROINSTRUCTION , QUERY CORRECTIVE SEQUENCE TABLE TO IDENTIFY CORRECTIVE UOPS
1103

PERFORM QUANTUM OPERATIONS ON SPECIFIED QUBIT(S) OVER CLASSICAL-QUANTUM INTERFACE
1104

PERFORM QUBIT MEASUREMENT(S) IN RESPONSE TO CODEWORD SPECIFYING MEASUREMENT
1105

CONVERT ANALOG MEASUREMENT TO DIGITAL VALUES, PERFORM ERROR DETECTION/CORRECTION, MACHINE LEARNING, AND STORE IN SHARED REGISTER FILE
1106

END

*FIG. 11*

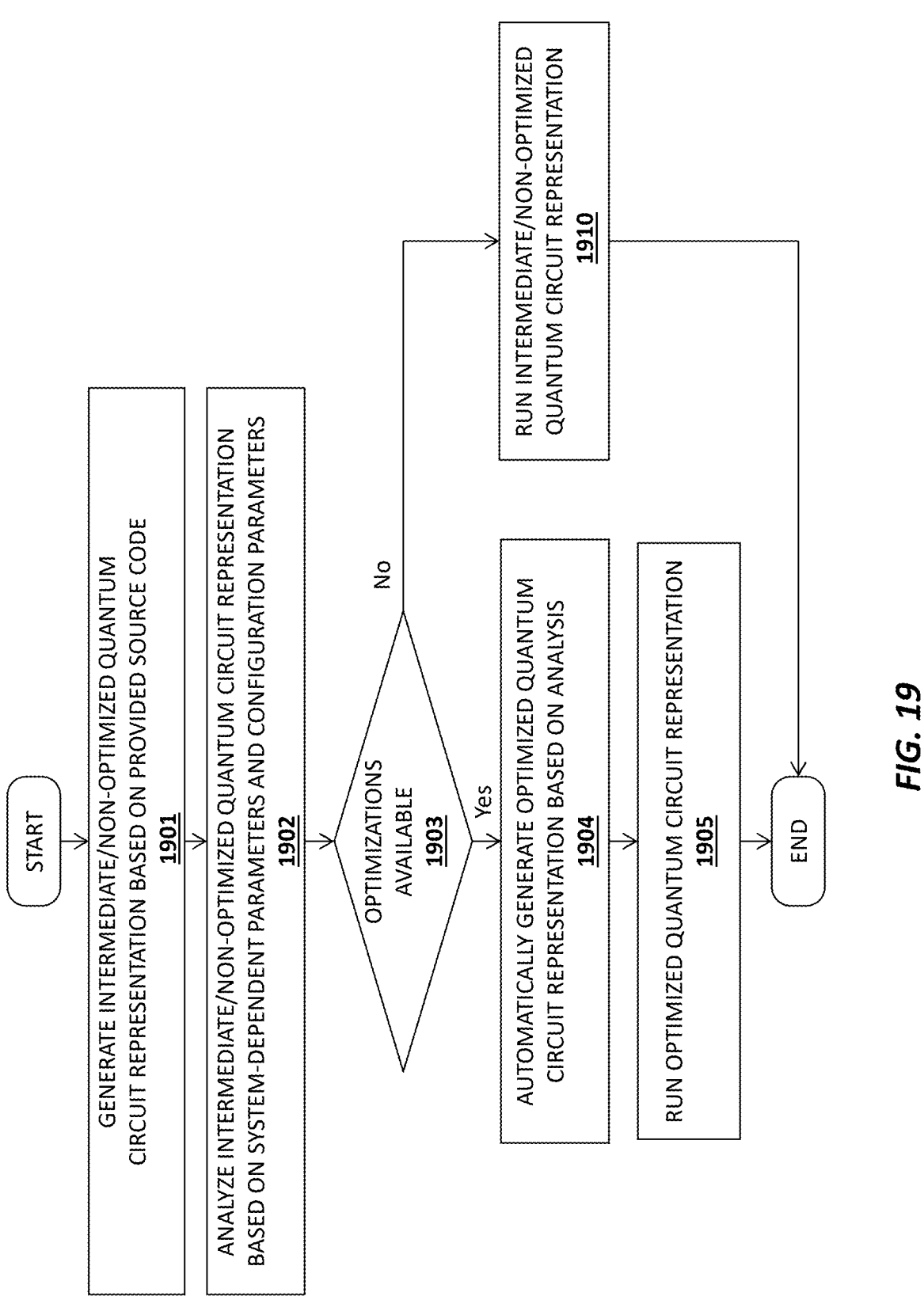

START

GENERATE INTERMEDIATE/NON-OPTIMIZED QUANTUM CIRCUIT REPRESENTATION BASED ON PROVIDED SOURCE CODE
1901

ANALYZE INTERMEDIATE/NON-OPTIMIZED QUANTUM CIRCUIT REPRESENTATION BASED ON SYSTEM-DEPENDENT PARAMETERS AND CONFIGURATION PARAMETERS
1902

OPTIMIZATIONS AVAILABLE
1903

No

Yes

RUN INTERMEDIATE/NON-OPTIMIZED QUANTUM CIRCUIT REPRESENTATION
1910

AUTOMATICALLY GENERATE OPTIMIZED QUANTUM CIRCUIT REPRESENTATION BASED ON ANALYSIS
1904

RUN OPTIMIZED QUANTUM CIRCUIT REPRESENTATION
1905

END

FIG. 19

METHOD AND APPARATUS FOR QUANTUM-CLASSICAL RESOURCE BALANCING OPTIMIZATIONS

BACKGROUND

Field of the Invention

The embodiments of the invention relate generally to the field of quantum computing. More particularly, these embodiments relate to an apparatus and method for quantum-classical resource balancing optimizations.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

A better understanding of the present invention can be obtained from the following detailed description in conjunction with the following drawings, in which:

FIGS. 1A-1F illustrate various views of an example quantum dot device, in accordance with one embodiment;

FIGS. 5A-B illustrate an example quantum circuit and program code to implement the quantum circuit;

FIGS. 6A-B illustrate an example in which quantum instructions are generated by a compiler, decoded into uops, and executed within a quantum execution engine;

FIG. 7 illustrates a method in accordance with one embodiment of the invention;

FIG. 9 illustrates a method for determining qubit index values for identifying qubits;

FIG. 11 illustrates a method for managing and using corrective uop sequences;

FIG. 19 illustrates a method in accordance with embodiments of the invention.

DETAILED DESCRIPTION

Figure 1A:
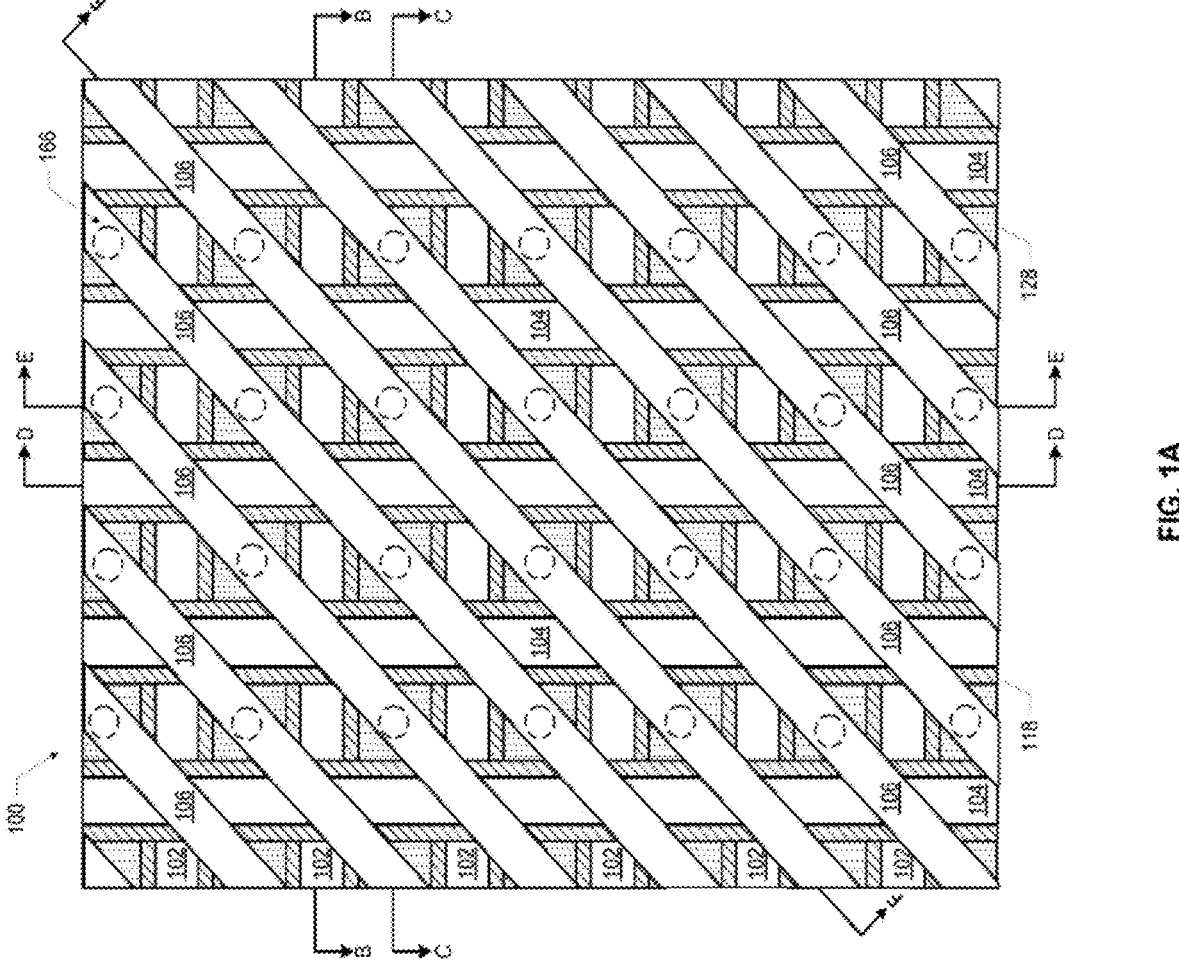

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

INTRODUCTION

A quantum computer uses quantum-mechanical phenomena such as superposition and entanglement to perform computations. In contrast to digital computers which store data in one of two definite states (0 or 1), quantum computation uses quantum bits (qbits), which can be in superpositions of states. Qbits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qbit states are typically represented by the bracket notations $|0\rangle$ and $|1\rangle$. In a traditional computer system, a bit is exclusively in one state or the other, i.e., a '0' or a '1.' However, qbits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qbits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED) devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qbits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1F:
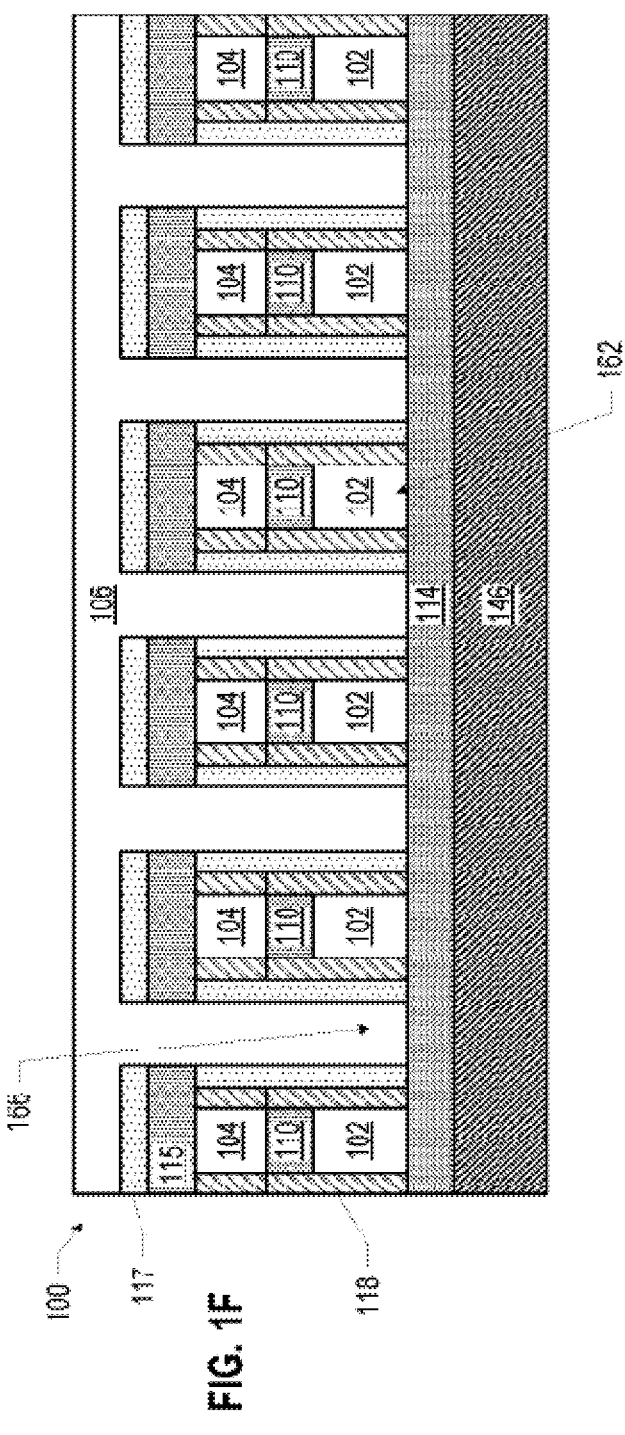

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 of FIG. 1 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100 of FIG. 1, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid, as depicted in FIG. 1.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for a Hybrid Classical Quantum Computer

After Richard Feynman asked in 1982 whether quantum physics could be simulated efficiently using a quantum computer, much effort researching for a quantum computer has been focused on its universality and its efficiency over classical computation. One such example is David Deutsch's quantum Turing machine in 1985 that can be programmed to perform any computational task that can be performed by any physical object.

In contrast to theories and algorithms, quantum physical machines are in still their infancy. Efforts to build quantum information processing systems have resulted in modest success to date. Small quantum computers, capable of performing a small set of quantum operations on a very few qubits, represent the state of the art in quantum computation. In addition, quantum states are fragile in the sense that quantum states only remain coherent for a limited duration. This gap between algorithms and physical machines has driven the effort to invent hybrid classical-quantum algorithms. Some recent quantum algorithm developments have focused on short-depth quantum circuits to carry out quantum computations formed as subroutines embedded in a larger classical optimization loop, such as the variational eigensolver (P. J. J. O'Malley, 2016). Quantum languages, tools, and flows have been developed, providing software layers/stacks to translate and optimize applications to the quantum physical layer to cope with the stringent resource constraints in quantum computing (Frederic T. Chong, 2017, 14 Sep.).

On the hardware side, classical computers have been used to perform error correction for quantum computations. The "quantum co-processor" model is the most favorable prevailing execution model where a classical CPU controls a quantum processing unit in a similar manner to how CPUs in modern computer systems interact with GPUs. As described in (X. Fu, 2016 May) and (X. Fu, 2018), the microarchitecture for experimental superconducting quantum co-processors included features such as an arbiter on the code fetch data path to steer classical instruction to host CPU and quantum instruction to quantum co-processor, an exchange register file to synchronize register files between host CPU and the quantum co-processor, and a quantum instruction cache.

The microarchitectures for these mechanisms, however, are not well defined and explicit support for hybrid classical-quantum programs is lacking. Consequently, it is unclear how a quantum co-processor would be implemented within a quantum computer, particularly one which is required to run a diverse set of quantum programs. A flexible and programmable model has yet to be developed for executing hybrid classical-quantum algorithms.

One embodiment of the invention adds a set of quantum instructions to an instruction set architecture (ISA) of a processor such as a CPU. By way of example, these instructions may be included in an extension to the ISA (e.g., such as the AVX-512 extensions for the x86 platform). In addition, in one embodiment, a quantum engine is added to the processor's execution unit and the new quantum instructions are fetched, decoded, scheduled, and executed on the functional units of the quantum engine. In one embodiment, the quantum engine interacts with the classical execution engines using a shared register file and/or system memory. Upon executing the quantum instructions (or quantum uops in certain embodiments described herein), the quantum execution engine generates control signals to manipulate the state of the qubits within the quantum processor. The quantum engine also executes instructions to take a measurement of specified sets of qubits and store the results. In these embodiments, a quantum/classical interface provides connectivity between the quantum engine of the classical processor and the quantum processor.

Figure 2:
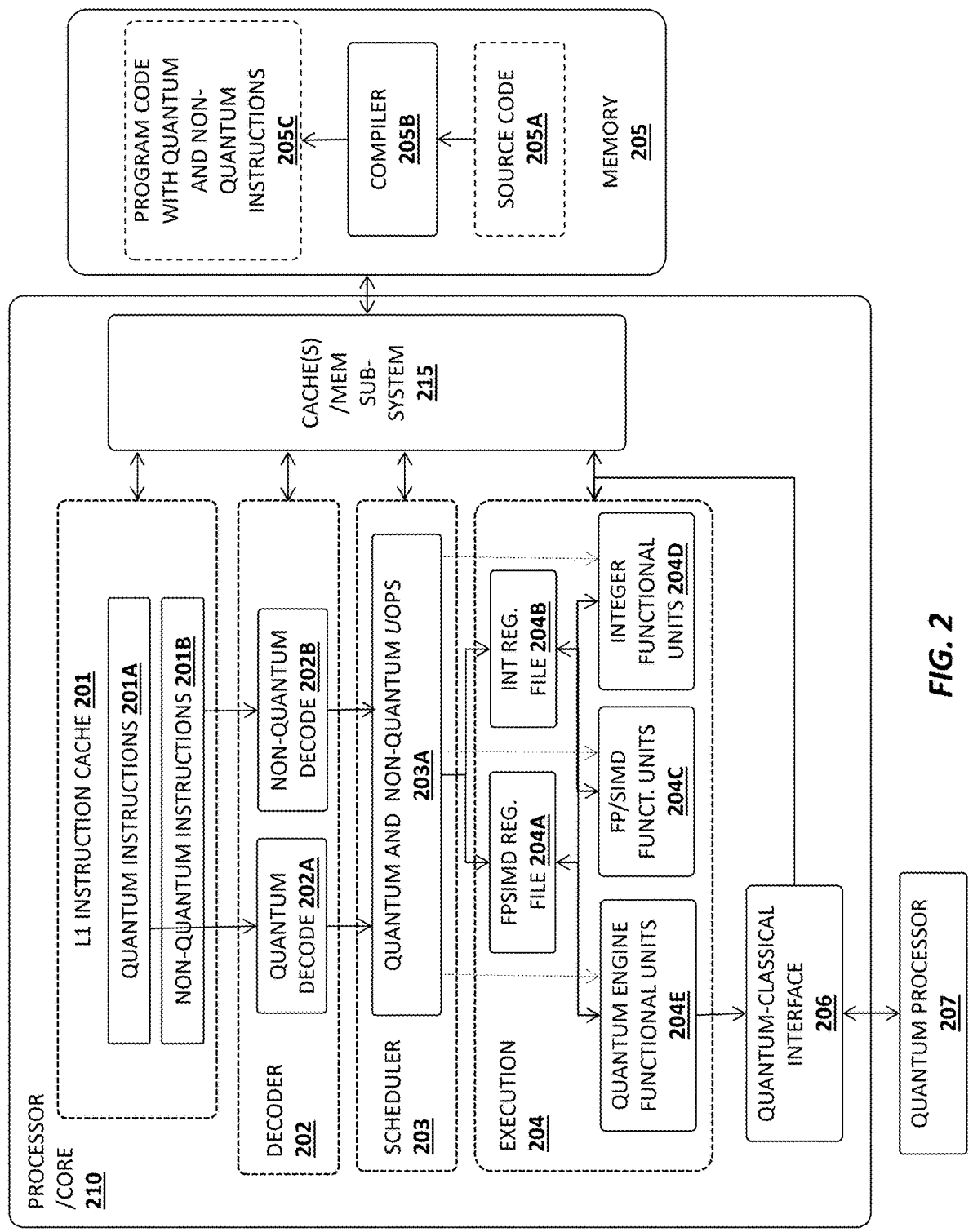
FIG. 2 illustrates one embodiment of a processor pipeline for processing quantum and non-quantum instructions.

FIG. 2 illustrates one embodiment of a processor or core 210 which fetches, decodes, and executes quantum instructions 201A and non-quantum instructions 201B, utilizing the same pipeline resources as the non-quantum instructions 201B. The processor/core 210 of this embodiment supports quantum extensions to an existing ISA of the processor/core 210 (e.g., extending the ISA to include the quantum instructions 201A). Program code 205C comprising the quantum and non-quantum instructions is generated by a compiler 205B from source code 205A written by a programmer (e.g., utilizing the extended ISA). Various source/program code examples are provided below.

Quantum and non-quantum instructions 201A-B are fetched from memory 205 at the front end of the instruction pipeline and stored in a Level 1 (L1) instruction cache 201. Instructions and data may also be stored within a Level 2 or Level 3 cache within a cache/memory subsystem 215, which manages memory requests and cache coherency.

A decoder 202 decodes the instructions 201A-B into micro-operations or uops 203A which are scheduled for execution by a scheduler 203 and executed by execution circuitry 204. In one embodiment, certain stages of the pipeline are enhanced to include hardware support for processing the quantum instructions 201B while other stages are unaltered. For example, quantum decode circuitry 202A may be added to the decoder 202 for decoding the quantum instructions 201A, just as non-quantum decode circuitry 202B decodes non-quantum instructions 201B. Although illustrated as separate components in FIG. 2 for the purpose of explanation, the quantum decode circuitry 202A and non-quantum decode circuitry 202B may comprise a common or overlapping set of circuitry and/or microcode. For example, in one embodiment, an existing decoder may be extended to include microcode support for quantum instructions (e.g., in microcode ROM) to generate new sets of quantum uops. The decoder 202 includes other decode circuitry such as a set of decode table structures (see, e.g., FIG. 3 and associated text), depending on the processor architecture.

In one embodiment, the decoder 202 generates a sequence of uops 203A in response to decoding the instructions 201A-B. In an implementation with quantum and non-quantum instructions, the uops may include a mixture of quantum uops and non-quantum uops, which are then scheduled for execution by an instruction scheduler 203.

The quantum and non-quantum uops 203A generated by the decoder 202 may initially be queued for execution within one or more uop queues of the scheduler 203, which dispatches the uops from the uop queue(s) in accordance with dependencies and/or execution resource availability. The embodiments of the invention may be implemented on various different types of processors with different types of schedulers. For example, in one embodiment, a set of execution "ports" couple the scheduler 203 to the execution circuitry 204, where each execution port is capable of issuing uops to a particular set of functional units 204C-E. In the example architecture shown in FIG. 2, for example, SIMD and floating point (FP) uops may be issued by the scheduler 203 over a FP/SIMD execution port coupled to a set of FP/SIMD functional units 204C and integer uops may be issued over an integer port coupled to a set of integer functional units 204D. While only two types of non-quantum functional units are shown for simplicity, the processor/core 210 may include various other/additional non-quantum functional units (e.g., such as load/store address generation units, branch units, additional SIMD and integer units, etc).

In the particular embodiment shown in FIG. 2, the quantum engine functional units 204E share the same set of register files 204A-B used by the legacy processor functional units 204C-D. In this particular example, the register files 204A-B include a FP/SIMD register file 204A which stores floating point and SIMD operands used by the FP/SIMD functional units 204C and an integer register file 204B which stores integer operands for the integer functional units 204D. In one implementation, the FP/SIMD register file 204A comprises 512 bit vector registers and the integer register file 204B comprises 64-bit scalar registers. Of course, different processor architectures will use different types of registers shared by the quantum engine functional units 204E. Various other types of registers may also be used such as a set of control/status registers and mask registers.

In an embodiment in which quantum uops are mixed with non-quantum uops, the quantum uops are issued over one or more quantum ports to a set of quantum engine functional units 204E, which execute the quantum uops to perform the underlying quantum operations. For example, the quantum engine functional units 204E, in response to the quantum uops, may generate control signals over a quantum-classical interface 206 to manipulate and take measurements of the qubits of a quantum processor 207.

The quantum-classical interface 206 includes digital-to-analog (D-A) circuitry to convert the digital quantum control signals generated by the quantum engine functional units 204E to analog signals required to control the quantum processor 207 (e.g., such as the codeword triggered pulse generation (CTPG) units and Arbitrary Waveform Generator (AWG) described below) and also includes analog-to-digital (A-D) circuitry to convert the physical qubit measurements to digital result data.

In one embodiment, the quantum-classical interface 206 is integrated on the same semiconductor chip as the other components of the instruction processing pipeline (e.g., the execution circuitry 204, scheduler 203, decoder 202, etc). As discussed in detail below, different types of circuit/logic components may be used depending on the particular physical implementation of the quantum processor 207.

Figure 3:
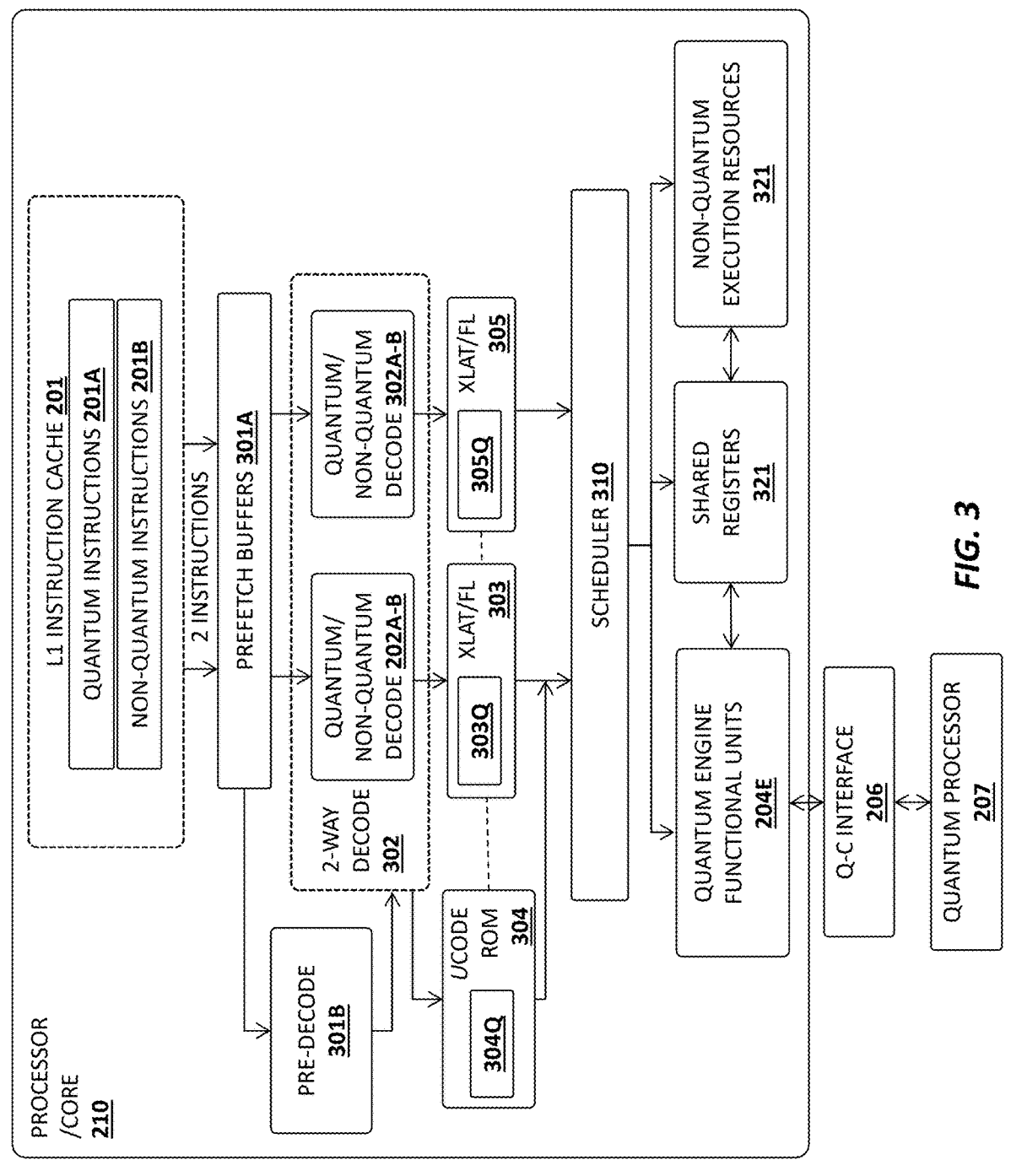
FIG. 3 illustrates an embodiment of front-end circuitry of a processor for processing quantum and non-quantum instructions.

FIG. 3 illustrates one embodiment in which quantum instruction processing support is added to a low power processing pipeline including a pre-decode buffer 301B, a 2-way decoder 302 with dual sets of quantum/non-quantum decoder circuitry 202A-B, 302A-B, dual lookup tables for instruction translation (XLAT), and a ucode ROM 304. In one embodiment, the XLAT components 303, 305 and ucode ROM 304 are extended to support the quantum instructions, as indicated by logic blocks 303Q-305Q. The pre-decode buffer 301B detects and marks macroinstruction boundaries prior to full decoding into uops by the 2-way decoder 302.

The operands for the quantum and non-quantum uops are stored in a set of shared registers 321 (as described above) and accessed by the quantum functional units 320 when executing the uops. The Q-C interface 320, in response to the quantum uops, controls the operation of the quantum processor 207.

Figure 4A:
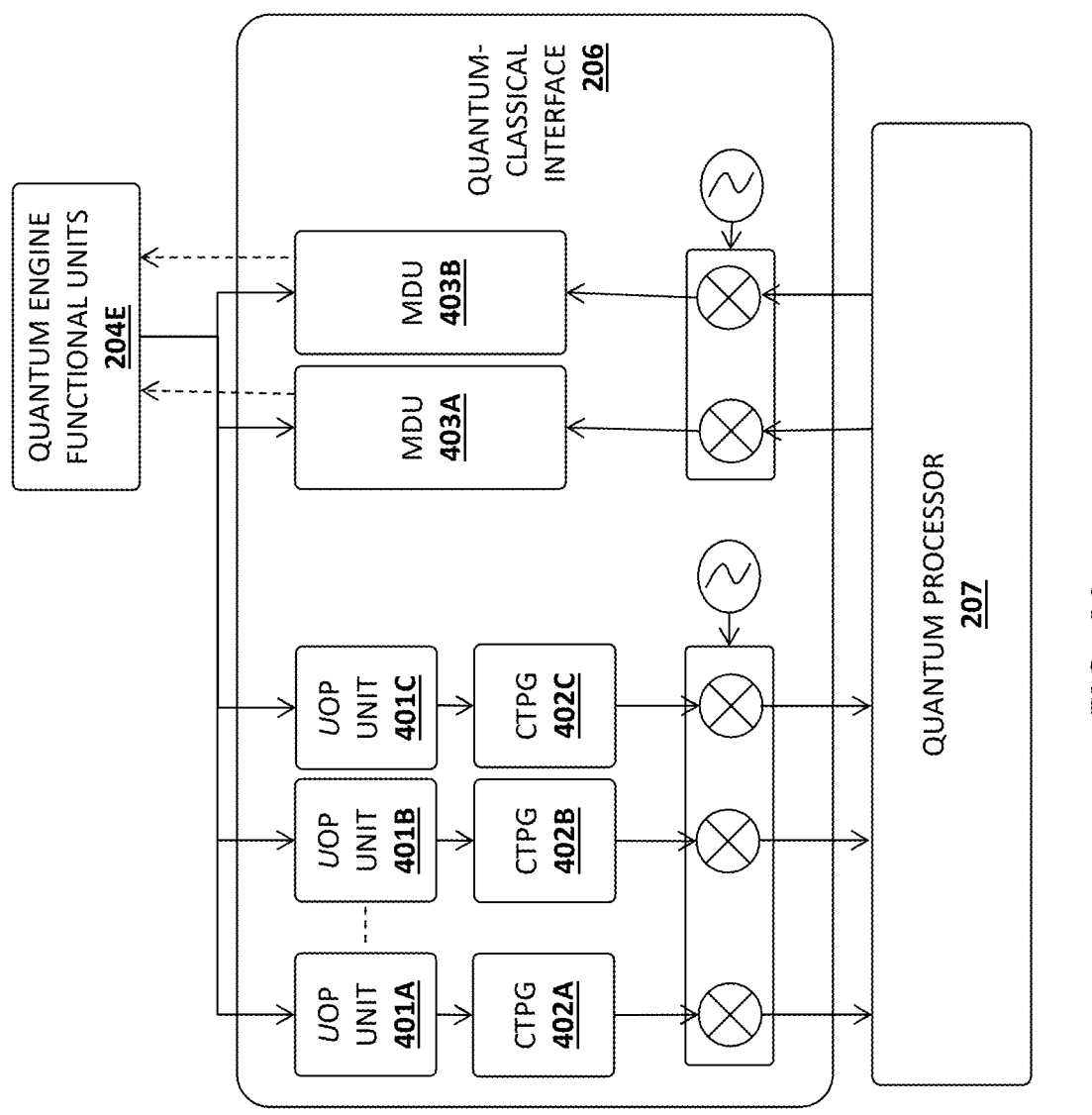
FIGS. 4A-B illustrate embodiments of a quantum-classical processor interface.
Figure 4B:
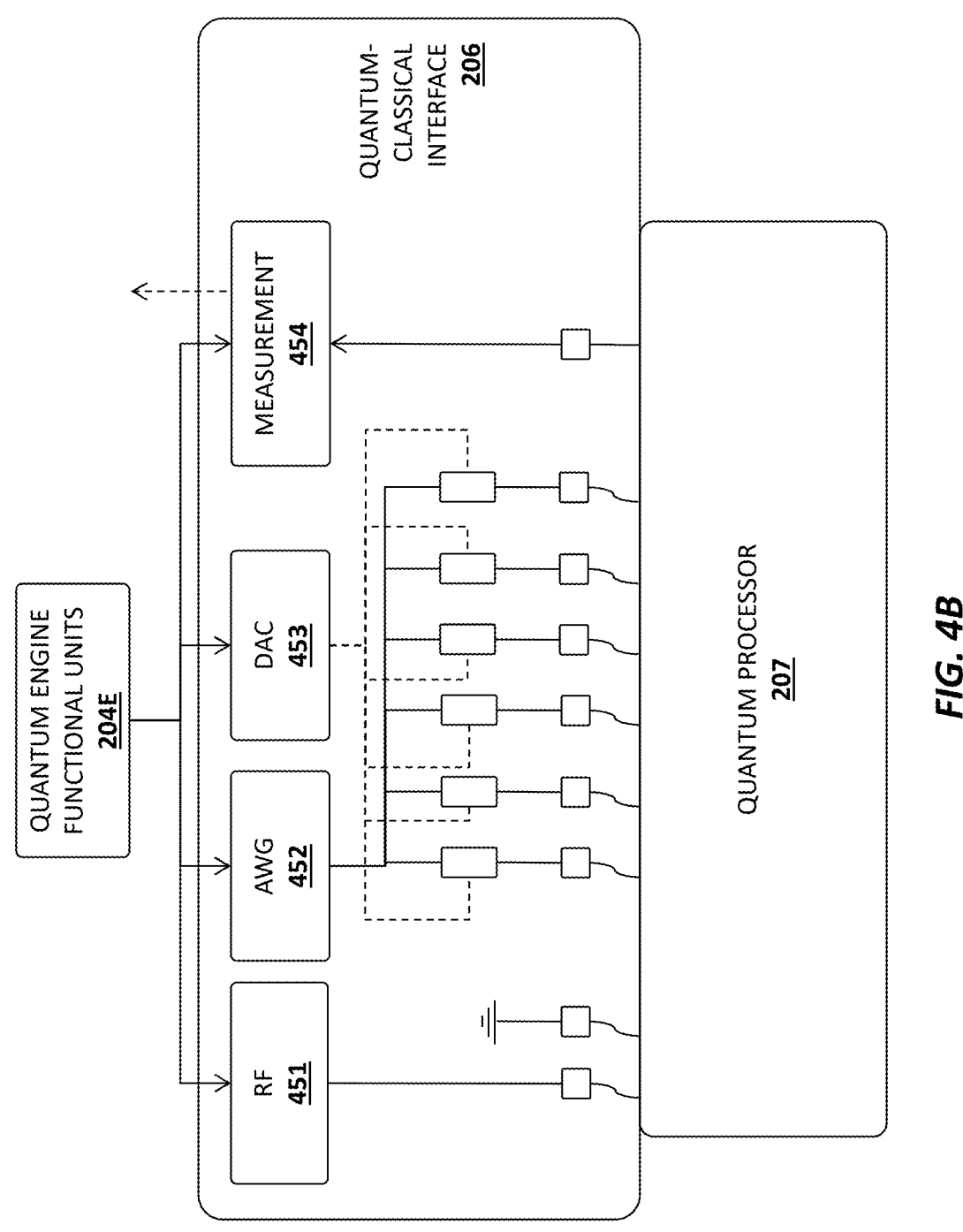

Different examples of a quantum-classical interface 206 are illustrated in FIGS. 4A-B. The Q-C interface 206 in FIG. 4A includes a plurality of uop units 401A-C which, responsive to the uops executed by the quantum engine functional units 204E, generate codewords to control operation of a plurality of codeword triggered pulse generation (CTPG) units 402A-C. In response, the CTPG units 402A-C generate sequences of pulses to control the qubits of the quantum processor 207. Once the quantum processor 207 has reached a specified execution state, quantum measurements are taken by one or more of the measurement discrimination units (MDUs) 403A-B.

The Q-C interface 206 shown in FIG. 4B includes a set of components to perform microwave complex signal generation including an RF microwave unit 451, a multi-channel Arbitrary Waveform Generators (AWG) 452, one or more digital to analog converters (DACs) 453 and one or more measurement units 454. In one embodiment, the input to each of these components comprises a set of codewords generated by the quantum engine functional units 204E and the output is an analog waveform which manipulates the state of the qubits of the quantum processor 207. The measurement units 454 measure a current state associated with one or more qubits at a designated point in execution.

Figure 5A:
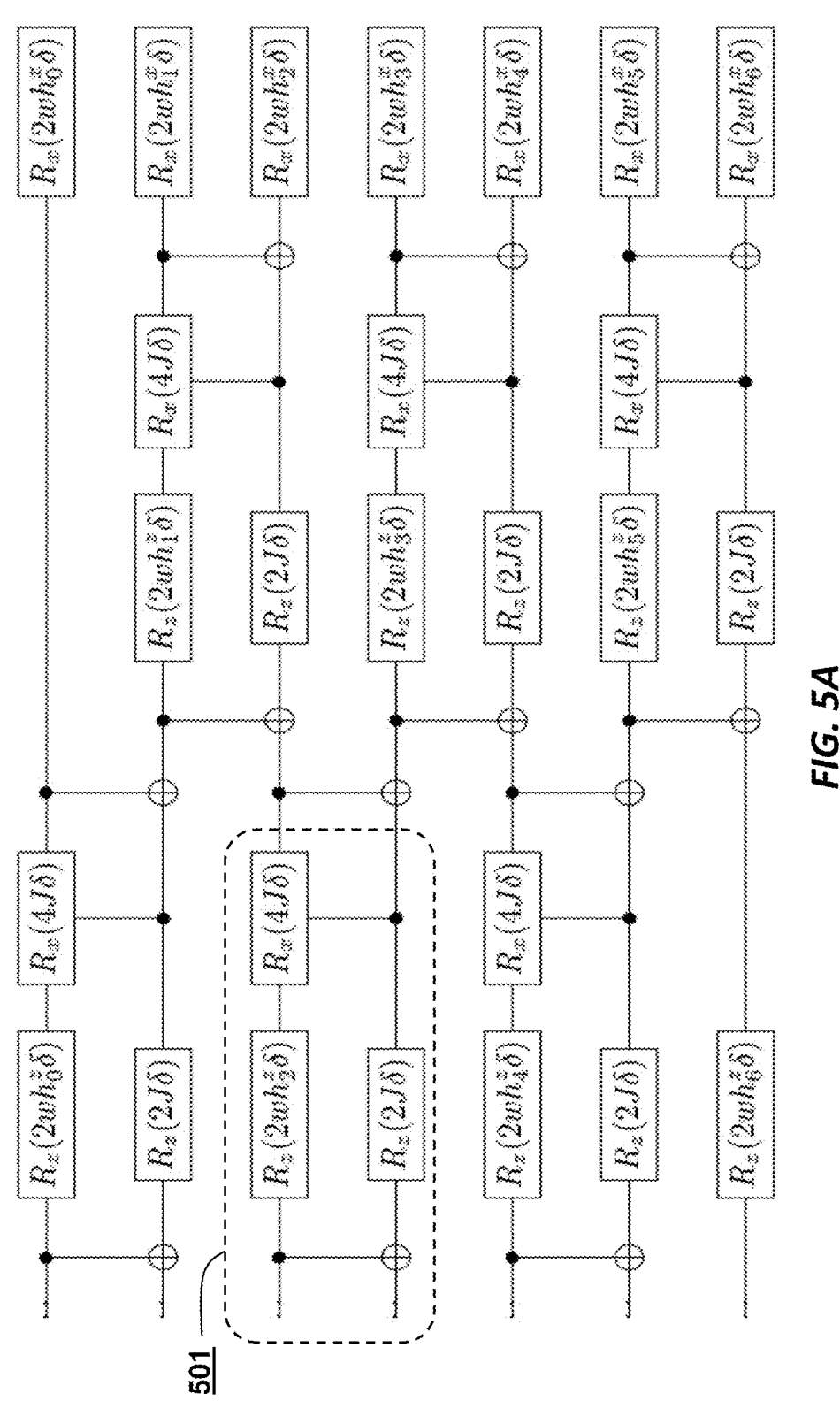

To further guide the analysis and discussion, a concrete example is illustrated in FIG. 5A, which shows a quantum circuit for a many-body disordered Hamiltonian to be time-evolved. Note that the angle through which Rx and Ry rotate are derived from several parameters. Particularly, $h_k^z$ and $h_k^x$ with $k \in \{0, 1, \ldots, 5, 6\}$ are randomly generated and are used to emulate large many-body systems that require many more number of qubits than what the underlying quantum chip supports.

One example of a quantum program that uses this circuit for a portion of its computation is illustrated in FIG. 5B which includes a mixture of quantum instructions and non-quantum instructions (as indicated by the comments to the right of the source code). In this example, NR is the number of disorder realizations (i.e. multiple small random realizations to emulate a large many-body system), NQ is the number of Qubits, NP is the number of iterations in order to achieve the required precision on Probability (Pr), NT is the number of Trotter steps, and a[i] accumulates Qubit measurement. The probability of qubits being in state |0> or |1> is obtained by repeating measurements (NP) and averaging.

This program structure shows how classical operations and quantum operations may be tightly intertwined and executed on the classical-quantum processing architectures described herein. The most efficient way to execute this program is to process all instructions in a pipeline such as those described above, with the quantum engine functional units 204E for controlling qubits configured as execution engine peer to other classical execution engines 204A-B (such as integer, floating point, etc.).

Figure 6A:
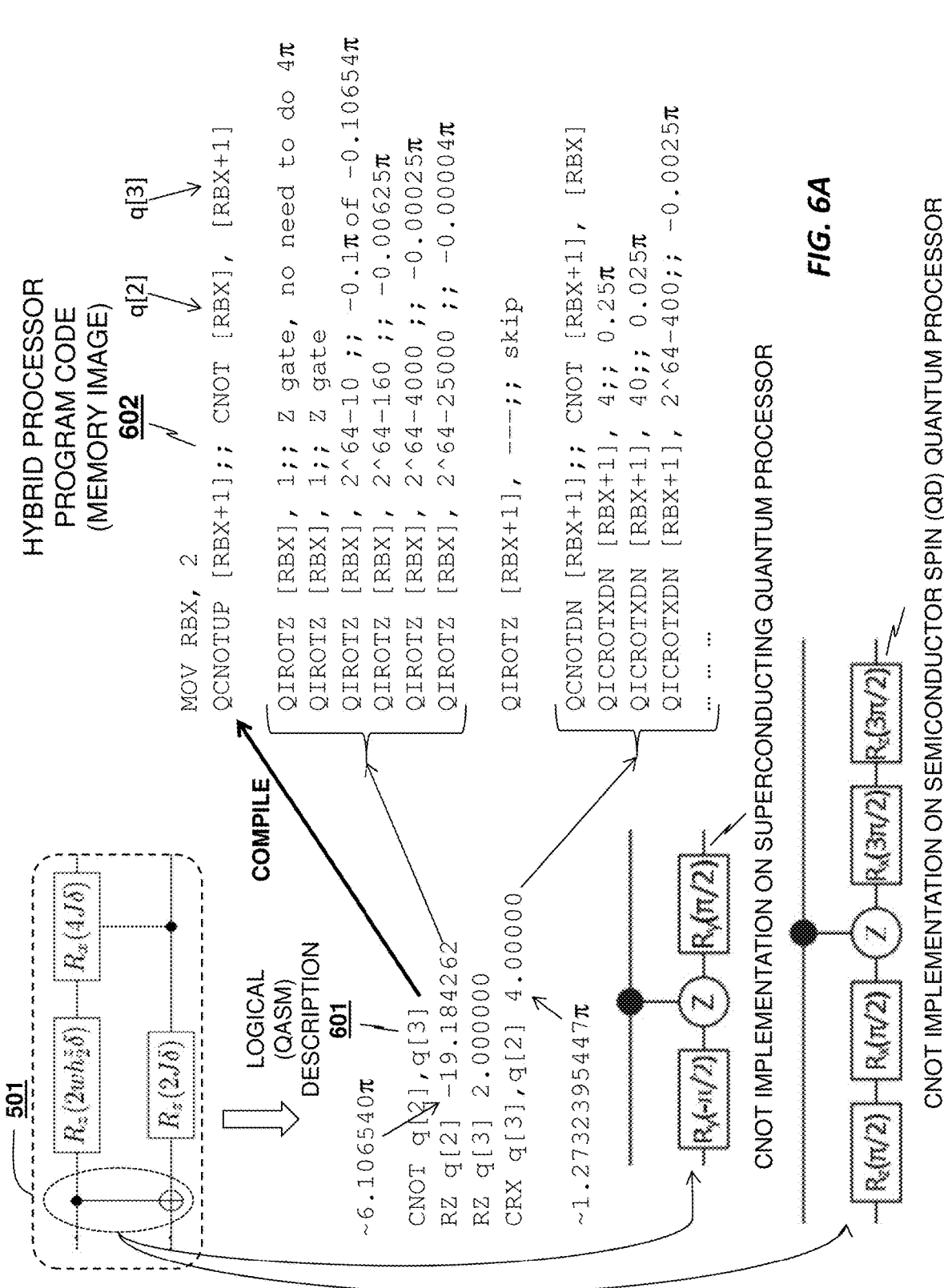

FIGS. 6A-B provide an example to demonstrate the operation of one embodiment of the invention. FIG. 6A illustrates a portion of quantum assembly language (QASM) code 601 to implement the highlighted portion 501 of the quantum circuit in FIG. 5A. The QASM code 601 is compiled into hybrid processor program code 602 in memory 205. In this example, the registers RBX and RBX+1 from the shared register file 321 or 204B are used to hold qubit indices to address logical qubits #2 and #3, respectively, in this particular example. The mapping of the relevant portions of the QASM code 601 to the hybrid processor program code 602 is indicated by arrows.

FIG. 6B illustrates how a quantum macroinstruction QCNOTUP (to implement a CNOT gate) is decoded into a series of uops 605 by the decoder 202. The uops 605 are executed by the quantum engine functional units 204E to generate codewords with a specified codeword or command packet format 606. In one particular format, a first data field indicates the qubit on which the operation is to be performed (qubit 3 in the example), a second data field indicates the channel over which the operation is to be transmitted (channel 4), a third field to indicate the command state (e.g., single command state), and a fourth data field to indicate the type of qubit (a transmon qubit). Of course, the underlying principles of the invention are not limited to any particular encoding format.

A method in accordance with one embodiment of the invention is illustrated in FIG. 7. The method may be implemented within the context of the processor architectures described above but is not limited to any particular processor or system architecture.

At 701 source code containing quantum instructions is compiled to generate runtime program code with quantum and non-quantum instructions. At 702 the quantum/non-quantum instructions are fetched from memory and stored in a local cache (e.g., the L1 instruction cache) or instruction buffer. As mentioned, quantum instructions may be freely mixed with non-quantum instructions within the pipeline.

At 703 the quantum and non-quantum instructions are decoded into sets of quantum and non-quantum uops, respectively, and stored in a queue prior to execution. At 704 the quantum/non-quantum uops are scheduled for execution based on uop and/or resource dependencies. For example, if a first uop is dependent on the results of a second uop then the first uop may be scheduled for execution only when the data produced by the second uop is available in one of the registers. Similarly, if a particular functional unit is busy, then the scheduler may wait for an indication that the functional unit is available before scheduling a uop which requires that functional unit. Various other/additional scheduling techniques may be implemented (e.g., scheduling based on priority, register load, etc).

At 705 the quantum uops and non-quantum uops are executed on their respective functional units within the execution circuitry. As mentioned, the shared register set may be used to store the source and destination operands required by these uops.

At 706, the results generated by the execution of the quantum uops may be used as input to an interface unit to control the quantum state of the qubits in a quantum processor. In one embodiment, a series of codewords or command packets may be generated which identify a quantum channel, one or more qubits within a quantum processor, a qubit type and/or a command state. The specific physical operations performed in response to the codeword or command packet is based on the underlying type of quantum processor used.

The embodiments described herein integrates quantum instructions within an existing processor pipeline. Because of the tight integration, these embodiments significantly reduces the various overheads/bottlenecks associated with current co-processor designs. These overheads/bottlenecks include, for example, the communication between the classical computation layers/modules and the quantum computation layers/modules in the software stack and between the classical CPU and the quantum chip via the message queue. Given the relatively small size of quantum routines, the current GPU-like co-processor implementations are inefficient.

Due to increased classical processing capabilities, hybrid co-processor models reduce some of the overhead. In one particular implementation which supports the hybrid co-processor model, many new micro-architecture mechanisms were introduced. However, these micro-architectural mechanisms were ambiguously defined as was the boundary between the classical CPU and quantum co-processor.

In contrast, in the hybrid architecture described herein, the classical computation pipeline is equipped to fully support a defined set of quantum instructions which may be freely mixed with non-quantum instructions both at the front end of the pipeline (i.e., at the macroinstruction level) and within the back-end of the pipeline (e.g., where quantum uops are mixed with non-quantum uops) and executed on functional units within the execution circuitry of the processor.

Scalable Qubit Addressing Mode for Quantum Execution Engine and/or Co-Processor

In quantum computing, a qubit is a unit of quantum information which is the quantum analogue of a classical binary bit. The computation is achieved by applying quantum gates, representing quantum logical operations, directly to qubits. Mathematically, this computing process is described as qubits undergo unitary transformations. Upon completion of computation, qubits are measured to gain information about the qubit states.

Therefore, to describe a quantum operation, it is necessary to identify the qubit or set of qubits to which the operation is applied. In a quantum program, each quantum instruction needs to encode both an operation to be performed and one or more qubits on which to perform the operation. In existing quantum instruction set architectures (e.g., QASM, Open QASM, QIS, etc) register operands are normally encoded in the opcode of an instruction. This scheme works for classical computing because the number of registers are very limited (e.g., 16, 32, 64, etc). However, this scheme is not scalable for quantum computing as quantum instructions will ultimately need to address a very large numbers of qubits. Consequently, encoding qubit addresses in the opcode field of quantum instructions would explode the instruction width.

As described above, in one embodiment, quantum instructions and non-quantum instructions are processed together within a shared processor pipeline. As such, the quantum instructions may rely on the same addressing modes as those available to the non-quantum instructions. The qubits in this embodiment are therefore addressed in a similar manner as non-quantum instructions which access system memory, providing a sufficiently large address space to accommodate a large number of qubits.

Figure 8:
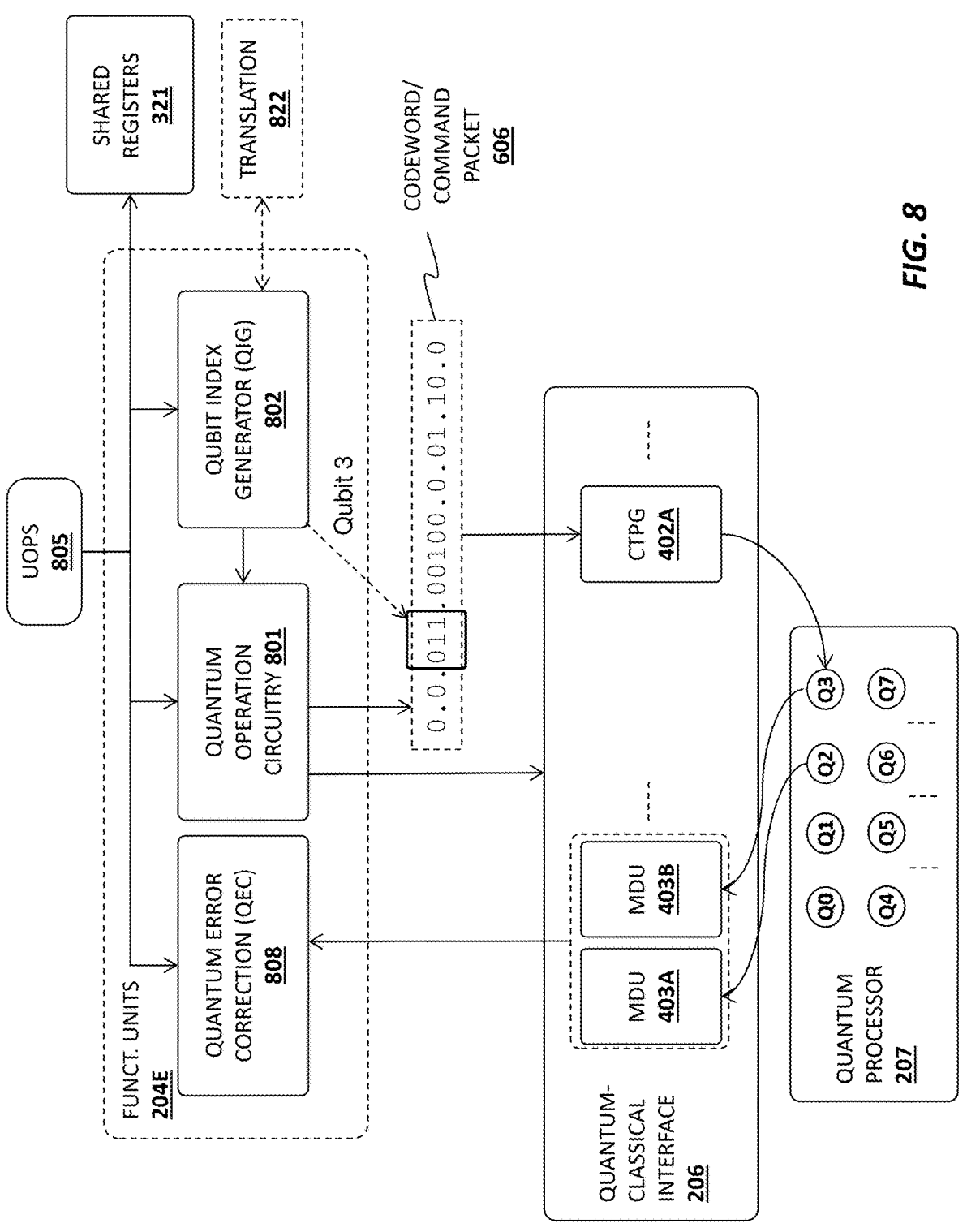
FIG. 8 illustrates one embodiment of a qubit index generator for addressing qubits within a quantum processor.

As illustrated in FIG. 8, in this embodiment, the quantum engine functional units 204E include a qubit index generation unit (QIG) 802 which determines a qubit index value or qubit ID in response to one or more uops 805. One or more quantum operation units 801 process the operations specified by the uops. The qubit index value (e.g., 011 for qubit 3 in the example) is then incorporated within the codeword/command packet 606, potentially along with one or more commands generated by the quantum operation unit 801 in response to processing the uops 805.

The QIG 802 may operate in accordance with different addressing modes supported by the processor. In one embodiment, the instruction identifies one of the shared registers 321 which contains the qubit index value (sometimes also referred to as a qubit ID). It may then use the qubit index value to identify the qubit within the codeword/command packet 606 and/or perform an operation using the qubit index value to generate one or more additional qubit index values. For example, it may add the qubit ID value to an integer specified by the uop to generate a second qubit ID.

The following examples demonstrate one way in which the QIG 802 generates qubit IDs in response to uops using an x86 assembly syntax. These operations may be performed within an x86 pipeline extended to support quantum instructions. However, the same general principles may be implemented on any processor architecture.

The single qubit instruction "QIROTX [RDI], 1" applies an X gate to the qubit number stored in RDI. Thus, if RDI contains 5, the X gate is applied to qubit number 5. In this example, the QIG 802 determines the qubit ID simply by reading the value stored in RDI (which is one of the shared registers 321 in this example). In this embodiment, the RDI value was stored previously by another uop. As another example, if the architecture register RBX contains a value of 2, then the two qubit instruction "QCNOTUP [RBX+3]," applies a CNOT operation with qubit 2 (q[2]) being the control qubit and qubit 5 (q[5]) being the target qubit. The QIG interprets the [RBX+3] notation as: the ID of the control qubit is stored in RBX and the ID of the control qubit+3 is the target qubit ID. Thus, the addressing scheme is extended so that two different qubits can be addressed with a single instruction, (i.e., CNOT). In contrast, in classical computing, only one memory location is addressed per instruction.

FIG. 8 also illustrates a codeword triggered pulse generator (CTPG) 402A which includes control logic and an analog-to-digital converter for interpreting the codeword/command packet 606 to identify one or more qubits (Q3 in the example) and generate a sequence of pulses to implement the specified quantum operations. When all of the quantum operations have been performed, as specified by the program code 205C, the quantum operation circuitry 801 and QIG 802 generates a codeword/command packet 606, causing one or more MDUs 403A-B to take a measurement of one or more qubits (as specified by the QIG 802 which generates the qubits indices). As mentioned, the MDUs include analog-to-digital circuitry to convert the analog measurements to digital values, which are then processed by a quantum error correction unit 808 to detect and potentially correct errors. If valid result data has been received it may be stored within one or more of the shared registers 321 and/or accumulated with prior measurement data. In addition to error correction, the measurement can also be used for program flow control based on measurement feedback.

The quantum error correction unit 808 may implement various techniques for detecting and correcting quantum errors. For example, in one embodiment, an error decoder (within the QEC unit 808) decodes a multi-qubit measurement from the quantum processor 207 to determine whether an error has occurred and, if so, implements corrective measures (is possible). The error measurements may be taken from multiple qubits in a manner which does not disturb the quantum information in the encoded state of the qubits (e.g., using ancilla qubits). In response, the QEC unit 808 generates error syndrome data from which it may identify the errors that have occurred and implement corrective operations. In one embodiment, the error syndrome data comprises a stabilizer code such as a surface code. In some cases, the response may simply be to reinitialize the qbits and start over. In other cases, however, modifications to the quantum algorithm implemented in the quantum program code 205C can be made to stabilize the region of the quantum processor responsible for the error (e.g., where compiler 205B includes a just-in-time (JIT) compiler). In either case, the CTPGs 402A perform the underlying physical operations under the control of the codewords/command packets 606 generated by the QEFU 204E. For example, the CTPG 402A may generate electromagnetic pulses to adjust the phase of one or more qbits in accordance with the detected phase error, or to reset the phase/spin of all qbits if re-initialization is required.

Addressing qubits in a manner which is similar to how classical CPU's address memory provides the scalability characteristics/attributes required for future quantum processor implementations. In particular, the above-described embodiments provide qubit indexing which is seamlessly integrated within an existing processor ISA and scales to a large number of qubit systems. These embodiments also remove pressure from the quantum instruction opcode space by way of a quantum extension to x86 or other architectures to address the qubit space and integrate quantum operations to existing processor pipelines.

A method in accordance with one embodiment of the invention is illustrated in FIG. 9. The method may be implemented on the architectures described above but is not limited to any particular processor or system architecture.

At 901 quantum and non-quantum instructions from runtime program code are fetched and decoded, generating quantum and non-quantum uops. At 902 an index generation unit evaluates quantum uops including register identifiers and optionally one or more values included with the uops to determine qubit index values. As described above, the indices may be generated using a variety of techniques including reading qubit index values from registers identified by the uops and generating additional qubit index values using integer values included with the uops.

At 902, the quantum execution circuitry generates a codeword specifying the quantum operations to be performed on the qubits identified by the calculated qubit index values. At 905, qubit measurements are performed in response to another codeword generated based on additional uops. At 906, the analog measurement made on one or more of the qubits are converted to digital values. Error correction and/or flow control may then be performed based on the resulted digital result values stored in a register file of the processor.

Apparatus and Method for Injecting Corrective Quantum Operations in a Processor Pipeline During two qubit operations in a quantum computing system an exchange or interaction mechanism is typically employed which adds a drift term to the phase of the interacting qubits. This drift term tends to degrade qubit coherence exponentially over sequences of two qubit operations resulting in a lower T2 (dephasing) time. This limits the amount of time available for quantum operations and reduces the robustness and usefulness of the quantum computing system.

The resilience of a quantum computing system can be improved using corrective pulse sequences transmitted along with the quantum operations. These corrective pulse sequences are generated statically by a compiler for later replay on quantum experimental hardware. Hand generated pulse sequences that compensate for decoherence in the quantum circuit may also be programmed directly into the system.

However, long trains of pulse sequences require exponential memory resources to store the waveforms prior to replay at the hardware level. In addition, bandwidth to feed the pulse train into the system hardware limits scalability to low circuit depth algorithms because of the overhead of sending corrective pulse sequences between each quantum gate operation. Hand-generated pulse sequences are tedious and not scalable to a large number of qubits or long circuit depth algorithms.

To build a more resilient quantum microcode for a general purpose quantum computing system, the issues of decoherence and incorrectly shaped control pulses need to be addressed. Decoherence refers to the fact that qubits decohere through loss of phase information encoded in them just by sitting idle. Imperfectly shaped control pulses can cause qubits to lose phase alignment, resulting in the qubits moving off resonance. The next quantum operation on that qubit will be only partially effective which results in a certain amount of error in the computation.

To address the above problems, one embodiment of the invention uses a lookup table or other indexed data structure (simply referred to below as a "lookup table") to store sequences of corrective operations associated with different quantum operations. When a quantum instruction is received in the decoder unit, the lookup table is accessed to determine whether there is a corrective sequence available for this quantum operation. The unique opcode of the macroinstruction or combinations of uops resulting from the macroinstruction may be used as an index to the lookup table, to identify any corrective actions. If a corrective pulse sequence is found, then a corresponding set of corrective uops specifying the pulse sequence are injected in the instruction stream in place of (and/or in combination with) the uops for the qubit operations.

The corrective uops are forwarded to the quantum execution unit, which executes the corrective uops to generate the corrective set of pulses. In one embodiment, the corrective uops are uniquely tailored to each specific qubit as well as different combinations of qubits (e.g., for two qubit operations between qubits). In one embodiment, the corrective set of uops to generate the corrective pulses may be compiled over time based on observations made with respect to specific qubits, sets of qubits, and/or specific operations. If a particular qubit or set of qubits is showing problems with decoherence, for example, then one or more uops may be automatically added to the lookup table to correct this issue.

The decoherence problem may be identified by a quantum error correction unit which, in one embodiment, includes a machine-learning engine to identify the decoherence problem based on an analysis of quantum calculations over a period of time. It may then identify a specific set of uops and operand values needed to correct the problem. Thus, one embodiment of the invention includes a quantum processor, an instruction decoder, a micro-op sequencer, and a quantum micro-code execution engine along with a look-up table that contains some preconfigured pulse sequences for each type of quantum gate which is supported by the instruction set.

Figure 10:
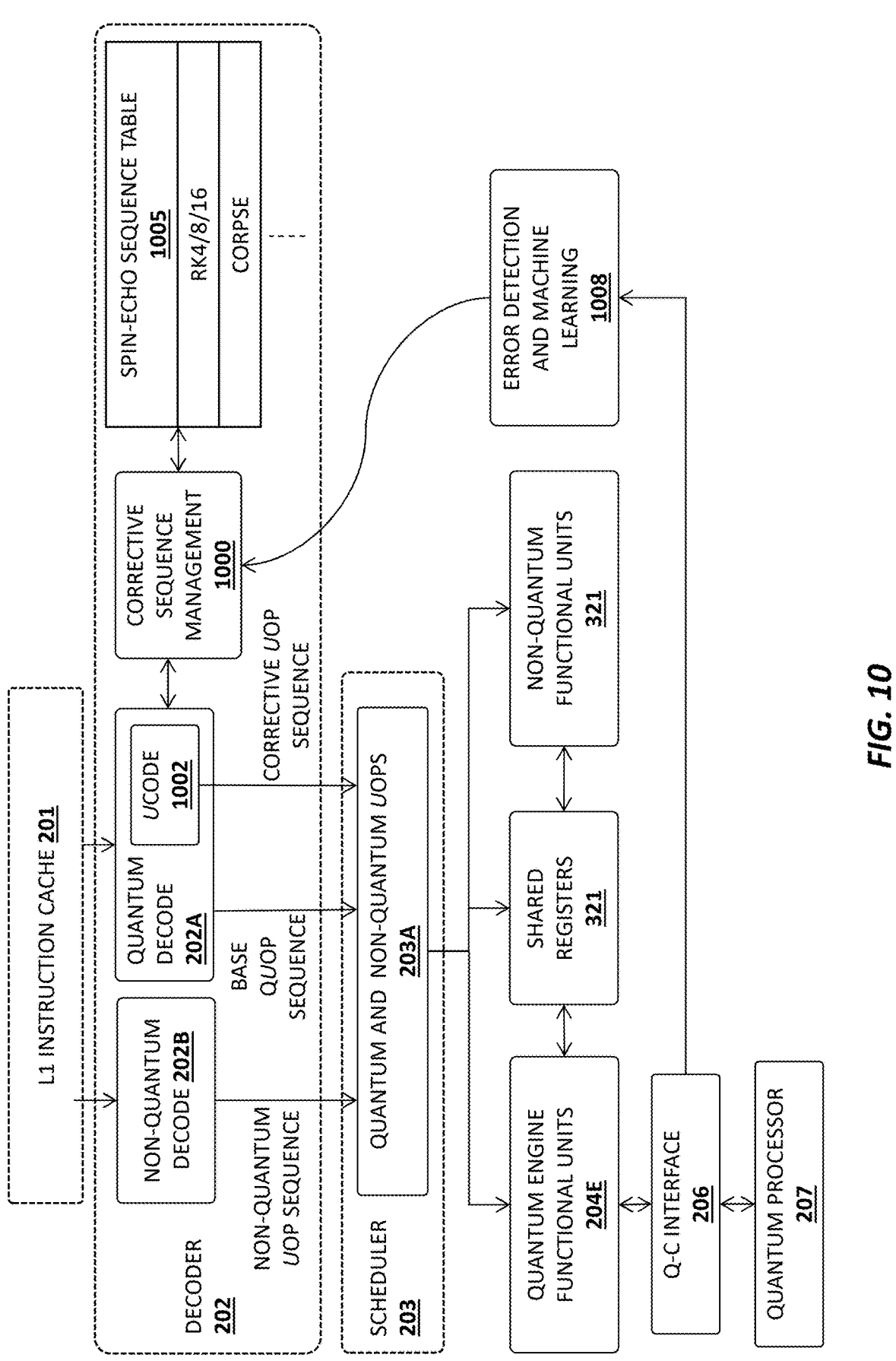
FIG. 10 illustrates one implementation which uses corrective uop sequences.

FIG. 10 illustrates one embodiment including a quantum decoder 202A with corrective sequence management logic/circuitry 1000 to manage and perform lookups in a spin-echo sequence table 1005 to store a specific set of uops and operand values for each instruction needed to correct qubit errors. When a quantum instruction is read into the quantum instruction decoder 202A, the corrective sequence management logic/circuitry 1000 performs a lookup to determine if there is a corrective pulse sequence for the qubit (or set of qubits) and/or the quantum operation identified by the instruction. If one is found, then the regular set of uops for the instruction are replaced by a corrective uop sequence. In the particular embodiment in FIG. 10, a corrective-pulse-generation enabled microcode sequencer (hereinafter "corrective microcode sequencer") 1002 generates the corrective uop sequence, which may replace the original uop sequence or may supplement it (e.g., integrating the corrective uops within the original uop sequence). In an embodiment in which the original uop sequence is replaced, the spin-echo sequence table 1005 contains the uops to realize both the echo sequence (for correction) as well as the uops to perform the operation specified by the quantum instruction.

Regardless of how it is generated, the corrective uop sequence is scheduled for execution on the quantum engine functional units 204E which executes the new composite pulse sequence via the Q-C interface 206.

In one embodiment, the spin-echo sequence table 1005 is statically generated based on calibration tests run on the quantum processor 207. After the initial static update, the corrective sequence management circuitry/logic 1000 dynamically updates the spin-echo sequence table 1005 over time, as new errors are associated with the various qubits of the quantum processor 207. In one embodiment, the error detection and machine-learning logic/circuit 1008 may continuously analyze results generated by the quantum processor 207 during runtime and specify corrective actions to be taken by the corrective sequence management circuitry/logic 1000, which then updates the spin-echo sequence table 1005 with new corrective uop sequences and/or new operand values needed to make the corrections. Decoherence, for example, may be identified by repeated errors related to the state of a particular qubit or a particular combination of qubits.

In one embodiment, when the error detection and machine-learning logic/circuit 1008 detects an error syndrome which it has not seen before, it will attempt to identify any correlations between the new error syndrome and previously learned models. Based on these correlations, it may generate a new entry in the spin-echo sequence table 1005 with a set of correction uops. If the corrective recommendation did not resolve the error, the error detection and machine-learning logic/circuit 1008 will make another attempt until desired results are achieved, at which point it will keep the corrective uops entered in the spin-echo sequence table 1005.

Thus, in one embodiment, the machine-learning logic/circuit 1008 performs unsupervised learning of new errors as they occur. Unsupervised learning is particularly beneficial for working with a quantum processor 207 because the physical responses of the individual qbits may change over time and may also vary from one quantum processor to another. In one implementation, the error detection and machine-learning logic/circuit 1008 is initially equipped with a set of basic models which are commonly used to detect and correct certain types of errors. Starting with this base set of models, the error detection and machine-learning logic/circuit 1008 continually trains itself in response to detecting new errors and update the models and the spin-echo sequence table 1005 accordingly. As a result, the error detection and machine-learning logic/circuit 1008 will become familiar with the particular characteristics of the quantum processor 207 with which it is associated and will learn to correct different types of errors, some of which may be unique to this quantum processor 207.

A method in accordance with one embodiment of the invention is illustrated in FIG. 11. The method may be implemented on the architectures described above but is not limited to any particular processor or system architecture.

At 1101 a corrective training sequence may be executed where the qubits of a quantum processor are evaluated through a series of operations and measurements to determine corrective operations. Based on the results, a corrective sequence table (e.g., the spin-echo sequence table described above) is updated with entries specifying corrective operations to be performed on this particular quantum processor in response to certain instructions. As described above, the corrective entries may be stored in a microcode ROM and may identify sequences of uops to be executed in place of or in addition to the uncorrected quantum uops.

At 1103, in response to a quantum macroinstruction, the corrective sequence table is queried to identify corrective uops associated with the quantum operation and/or the specific qubits which will be used. At 1104, the specified quantum operations are performed on specified qubits over the classical-quantum interface. At 1105, qubit measurements are performed in response to a codeword specifying measurement(s). At 1106, the analog measurements are converted to digital values which are subject to error detection/correction and, in one embodiment, machine learning. The machine learning, for example, may identify changes to the corrective sequence table to improve the corrective uop sequences. The measurement values may also be stored in the shared register file where they may be further processed.

Apparatus and Method for Integrating a Quantum Control Stack on a Chip

Small-scale quantum information processors have been realized with various physical architectures. These processors include racks of classical control electronics in addition to the physical quantum chip placed inside a dilution refrigerator.

As quantum devices continue to mature, there is an emerging need to efficiently organize and orchestrate all elements of the control electronics stack so that the quantum physical chip can be manipulated (electrical controls, microwaves, flux) and measured with acceptable precision, allowing quantum experiments and programs to be conducted in a reliable and repeatable manner.

Research efforts have started moving towards a more compact form of the control electronics stack and classical computing components. However, in all current proposals, the quantum computer is built from physically separate and independently designed components including a classical CPU, a quantum co-processor, and control electronics. Because these components are designed with more flexible and generalized interfaces, the communication between these components includes significant energy overhead, which negatively impacts the control and operational efficiency of the quantum processor.

Figure 12:
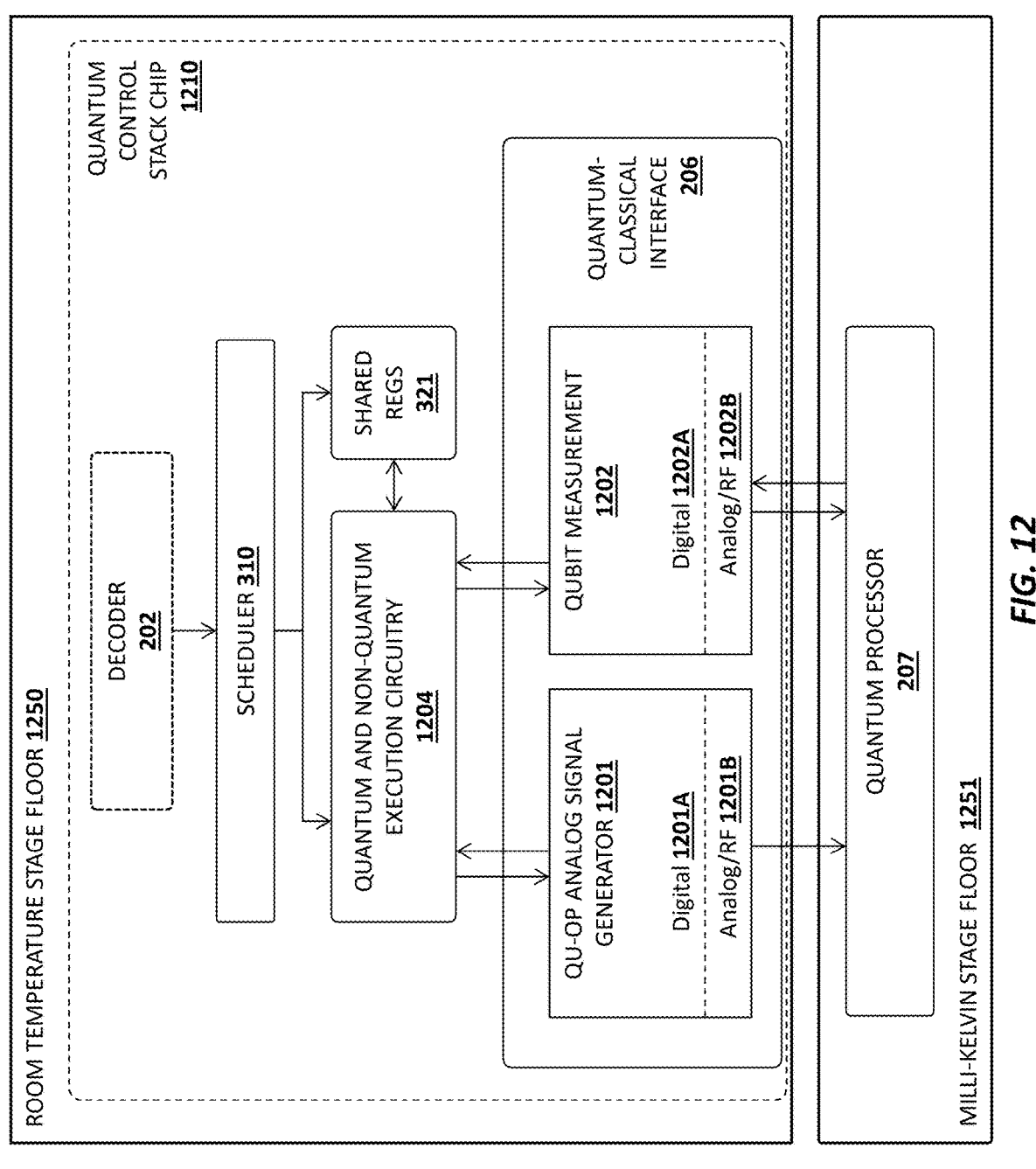
FIG. 12 illustrates one embodiment in which a quantum control stack is integrated on a single IC chip.

To solve these problems, one embodiment of the invention, illustrated in FIG. 12, integrates a classical CPU with support for quantum instructions, and quantum control electronics functions (DC, microwave, flux, measurement, etc) into one VLSI chip 1210. When integrated on the same chip, the communication between the different chip components may be highly optimized. In the particular embodiment shown in FIG. 12, the integrated quantum control stack chip 1210 includes an instruction decoder 202, scheduler 310, and execution circuitry 1204 for executing quantum and non-quantum instructions (as in the embodiments described above).

A quantum-classical interface 206 is also integrated on the quantum control stack chip 1210 which includes a quantum operation analog signal generator 1201 comprising an analog/RF component 1201B for generating analog signals to control the qubits of the quantum processor 207 based on digital waveforms received from the digital portion of the interface 1201A. In addition, qubit measurement circuitry 1202 includes an analog/RF measurement component 1202B for taking qubit measurements in response to signals received from a digital measurement component 1202A (e.g., responsive to execution of one or more measurement uops).

In one embodiment, the integrated quantum control stack chip 1210 has power/performance characteristics which allow it to be included within the room temperature stage floor 1250 of the quantum system and closely coupled to the quantum processor 207 which is maintained within the milli-kelvin stage floor 1251. In an alternate embodiment, a low temperature stage floor 1250 may be used (e.g., a 4k stage floor).

Thus, this embodiment eliminates any inter-module interface and communication overhead at architecture level, directly coupling the quantum control stack chip 1210 to the quantum processor 207. The individually designed chip 1210 includes standard interface protocols. For example, current implementations have control and measurement ICs which use low bandwidth buses, such as a serial peripheral interface (SPI) bus, to communicate with the primary controller chip. When the primary control chip and control/management ICs are integrated, the interface between these components can be removed. Integration enables a highly efficient pipeline and data-path to be design to communicate control and data between functional units.

In addition, the inter-module communication may be optimized at the architecture level, to pass operations and receive data between the commander and responder. One example of an architecture-level protocol optimization is in the queue-based signal crossing between the non-deterministic timing domain of the digital quantum control stack chip 1210 and the deterministic timing domain of the quantum processor 207. Optimizations may also be employed between clock domains.

In general, the embodiment illustrated in FIG. 12 removes the IC system design and operation overhead that would naturally exist when coupling individually designed VLSI modules. This embodiment also improves the inter-module communication efficiency with metal layers in the VLSI process node and direct communication.

While one embodiment integrates the digital processor 1210 with the control electronics 206 that drive analog control signals to the quantum physical chip 207 to manipulate qubits, all such control electronics functionality need not be integrated at the same time. For example, the integration can be staged to pull in certain integrated circuits which have been thoroughly tested first, and then other components when they become mature. By way of example, and not limitation, the DC electronics and flux AWG integration within the quantum-classical interface 206 may be performed at a later time.

Method and Apparatus for Quantum-Classical Resource Balancing Optimizations

Quantum computing has made remarkable progress in the last few years but reliably solving useful real-world problems has proven elusive. A current solution is to introduce hybrid classical-quantum algorithms whereby the computational load is shared by both quantum and classical resources. Using these techniques, the reliability and conventional speed of classical processors is leveraged when possible while harnessing the entanglement and superposition of quantum states to solve otherwise intractable bottlenecks. One such example is the variational quantum eigensolver (VQE) algorithm for ground-state energy estimation.

However, even in cases where hybrid calculation is feasible, the quantum routines may require the application of many one-qubit and two-qubit operations that will often exceed the coherence time budget provided by non-error corrected qubits. Since this time is short relative to what is required for problems of real interest, the focus of optimization is typically on reducing the quantum circuit as implemented on the quantum hardware, independent of the classical resources. Or, if the use of classical resources is considered for optimization, the classical resources are treated as free, and the tradeoff is always one in which quantum resources are traded for classical resources. This is often the correct tradeoff to make, but even in the near-term, and certainly as quantum hardware improves, there are times when it is advantageous to trade classical resources for quantum resources.

Previous solutions optimize quantum circuits by focusing on ways to best utilize only the quantum resources. When classical resources are considered during quantum circuit optimization, they are treated as free. In accordance with the deferred measurement principle, deferring measurements until the end of the quantum circuit does not alter the effective outcome.

Focusing on quantum resource reduction is generally the correct method in the short term, but there are identifiable cases where improved performance would be best achieved by considering the hybrid system as a whole. Additionally, placing the burden on the user to balance quantum-classical resources is not only taxing for the user, but also requires a sophisticated user with intimate knowledge of how hybrid programs are compiled and implemented.

Furthermore, conventional quantum circuit optimization techniques will typically preserve the quantum circuit's actions/effects such that the circuits will be fully equivalent. These techniques typically do not address any transformations which will fundamentally alter classical/quantum controlled-logic. This limitation neglects potential optimization avenues, thereby incurring increased quantum circuit depth, lower fidelities, and/or higher classical communication overhead.

With respect to deferred measurement, the deferred measurement principle has been applied to perform fundamental research experiments such as quantum eraser experiments (e.g. partially erasing entanglement). However, this principle has yet to be utilized in an effective quantum circuit compilation/synthesis for optimization.

Embodiments of the invention optimize hybrid quantum-classical programs based on internal knowledge of an entire hybrid quantum computing stack, making tradeoffs between quantum and classical resources in a way that preserves the overall desired logical outcome. Some embodiments are implemented as an automated algorithm optimization utility/application. These embodiments allow the compiler to use a whole-system approach to algorithm optimization and leverage internal knowledge of the full-stack system to outperform existing implementations in accuracy, time, and ease-of-use for solving real problems.

For the embodiments described below, a compilation-to-binary model is assumed. However, the underlying principles of the invention are not so limited. Embodiments of the invention may also apply to a "just-in-time" or "on-the-fly" compilation model.

As described below, implementations of the invention include: (1) optimizations performed on a quantum or hybrid quantum-classical program which trade classical resources for quantum resources or quantum resources for classical resources; and (2) automation of the analysis (entirely or partly) for making tradeoff decisions.

By way of example, and not limitation, the quantum resources under evaluation for potential tradeoffs can include: (a) the number of qubits used at any one time; (b) the maximum overall runtime for a single coherent run of the quantum system; (c) the maximum number of quantum operations to be performed in a single coherent run of the quantum system; (d) the total runtime of the quantum system for the entire hybrid program; (e) the total number of quantum operations for the entire hybrid program; and (f) the overall logical fidelity of the quantum state or quantum measurement outcomes.

The classical resources which may be traded for quantum resources (or vice versa) can include, but are not limited to: (a) the total runtime of the classical system for the entire hybrid program; (b) the latency times for communication between the classical and quantum systems; (c) the overall size of the compiled binary program; (d) the overall time taken for program compilation; (e) the number of compute nodes, parallelized processor cores, and/or the amount of memory needed for compilation.

The quantum-classical resource tradeoffs/modifications can include, but are not limited to, balancing quantum coherent control with classically conditioned operations, as well as balancing combinatorial circuit compilation, classically selected at runtime, with fixed single or fewer circuit compilation with embedded dynamic classical parameters selected at runtime (e.g., for conditionally-selected quantum subroutines). Additionally, some embodiments evaluate and implement tradeoffs between small classically-computed subroutines and invertible quantumly-computed subroutines (e.g., for classical Boolean functions) as well as tradeoffs between quantum qubit use/runtime and classical memory use/runtime using automated circuit cutting techniques.

Techniques for automating the analysis and implementation can include, but are not limited to one or more of: (a) evaluating potential tradeoffs based on information related to any part of the quantum system, which can include publicly available information (e.g., based on the architecture specifications) and non-public information (e.g., gleamed from using the quantum system to identify its unique characteristics); (b) evaluating tradeoffs based on information related to compilation or instruction generation (including both public and non-public information); (c) algorithmic solutions to perform decision-making about resource tradeoffs including those using machine-learning and similar techniques, which analyze results of prior resource allocation decisions to render subsequent resource allocation decisions; and (d) heuristic techniques that estimate the cost incurred by quantum and classical resources when the exact costs cannot be accurately determined in advance.

The following examples are provided to highlight certain embodiments of the invention. Note, however, that the underlying principles of the invention are not limited to the specific details provided in these examples.

A. Quantum-Controlled to Classical-Controlled Circuit

Figure 13:
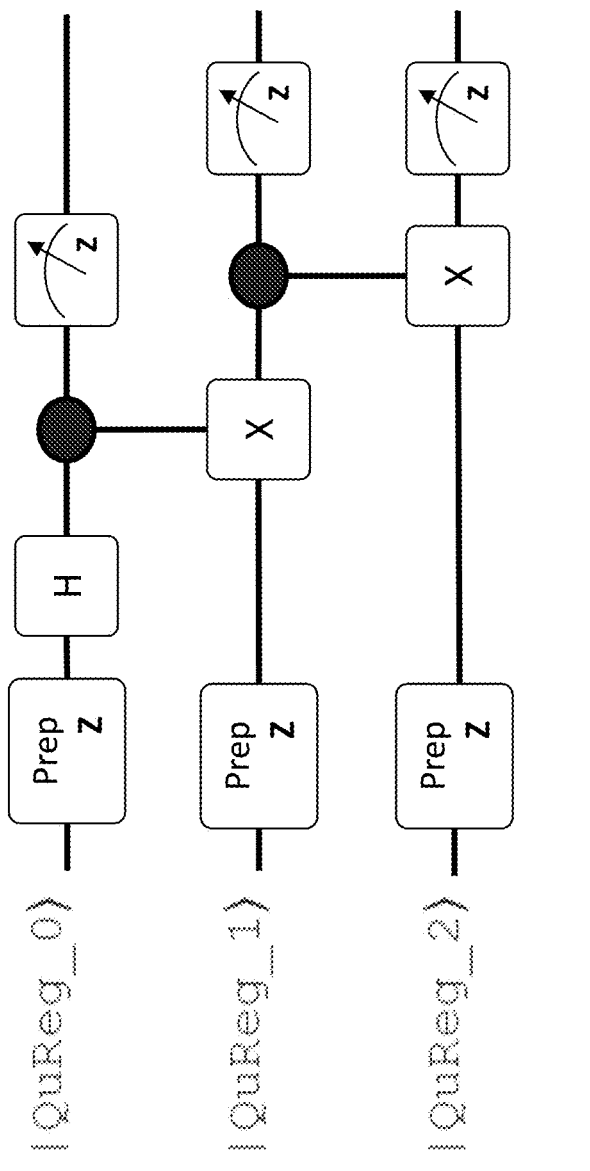
FIG. 13 illustrates an example of an input quantum circuit representation.
Figure 14:
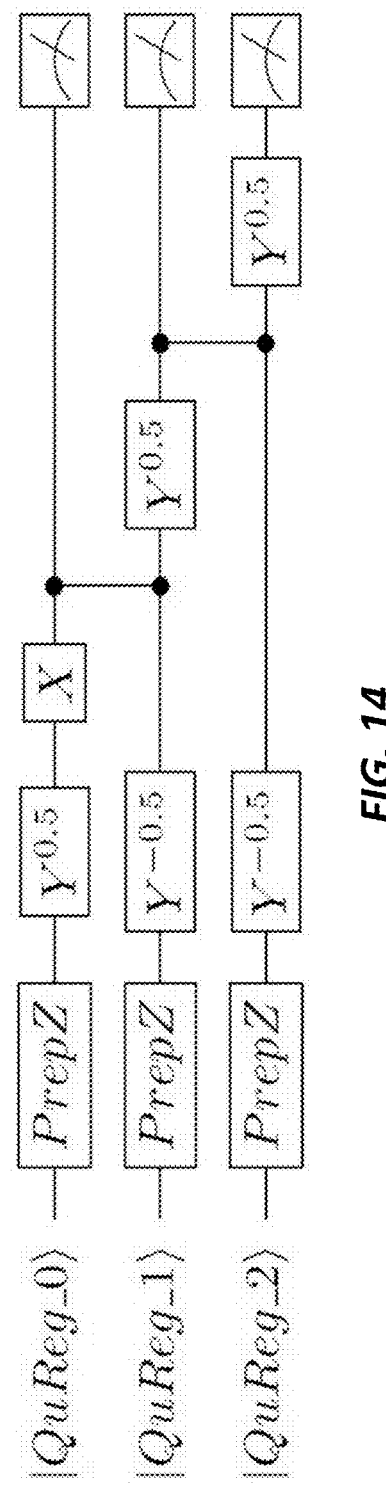
FIG. 14 illustrates an example of an unoptimized output quantum circuit representation.

One embodiment of the invention performs quantum to classical control conversion as highlighted in the below example, using a quantum circuit which performs generation and measurement of a 3-qubit GHZ state. Though this example is straightforward from an algorithmic perspective, it demonstrates the principle of making classical-quantum tradeoffs and how these tradeoffs can be automated. FIG. 13 illustrates a circuit diagram for the algorithm shown below, which is followed by a code sequence for the algorithm as generated by a non-optimized quantum compiler, represented in the circuit diagram in FIG. 14.

```
    Quantum Algorithm:
// Allocate 3 global qubits.
const int MAX_NUM_QUBITS = 3;
qbit QuReg[MAX_NUM_QUBITS];
cbit CReg[MAX_NUM_QUBITS];
quantum_kernel void GHZ( ) {
    for (int i = 0; i < MAX_NUM_QUBITS; ++i)
        PrepZ(QuReg[i]);
    H(QuReg[0]);
    for (int i = 0; i < (MAX_NUM_QUBITS – 1); ++i)
        CNOT(QuReg[i], QuReg[i + 1]);
    for (int i = 0; i < MAX_NUM_QUBITS; ++i)
        MeasZ(QuReg[i], CReg[i]);
}
    Quantum Code Sequence (Unoptimized Compiler Output):
"_Z12GHZ( ).QBB.0.v.stub":        // @"_Z12GHZ( ).QBB.0.v.stub"
// %bb.0:                         // %aqcc.quantum
    quprep QUBIT[0] (slice_idx=1)
    quprep QUBIT[1] (slice_idx=0)
    quprep QUBIT[2] (slice_idx=0)
    qurotxy QUBIT[0], 1.570796e+00, 1.570796e+00 (slice_idx=0)
    qurotxy QUBIT[1], 1.570796e+00, 4.712389e+00 (slice_idx=0)
    qurotxy QUBIT[2], 1.570796e+00, 4.712389e+00 (slice_idx=0)
    qurotxy QUBIT[0], 3.141593e+00, 0.000000e+00 (slice_idx=0)
    quephase QUBIT[0], QUBIT[1], 3.141593e+00 (slice_idx=0)
    qumeasz QUBIT[0] @shared_cbit_array[0] (slice_idx=0)
    qurotxy QUBIT[1], 1.570796e+00, 1.570796e+00 (slice_idx=0)
    quephase QUBIT[1], QUBIT[2], 3.141593e+00 (slice_idx=0)
    qumeasz QUBIT[1] @shared_cbit_array[1] (slice_idx=0)
    qurotxy QUBIT[2], 1.570796e+00, 1.570796e+00 (slice_idx=0)
    qumeasz QUBIT[2] @shared_cbit_array[2] (slice_idx=2)
```

-continued

```
    return
.Lfunc_end0:
```

Enabling optimization in the compiler produces the result as shown in the code sequence below and the circuit diagram in FIG. 15. It can be seen that the order of operations has changed. In this particular example, every 1Q and 2Q operation except the highlighted qurotxy operation on QUBIT[0] have been moved past the measurement operations (qumeasz). Given the nature of the circuit, this effectively indicates that all the subsequent operations past the MeasZ operations are required simply to enforce the outcome of state collapse following a measurement of an entangled system.

```
    Quantum Code Sequence With Optimization:
"_Z12GHZ( ).QBB.0.v.stub":        // @"_Z12GHZ( ).QBB.0.v.stub"
// %bb.0:                         // %aqcc.quantum
    quprep QUBIT[0] (slice_idx=1)
    quprep QUBIT[1] (slice_idx=0)
    quprep QUBIT[2] (slice_idx=0)
    qurotxy QUBIT[0], 1.570796e+00, 4.712389e+00 (slice_idx=0)
    qumeasz QUBIT[0] @shared_cbit_array[0] (slice_idx=0)
    qumeasz QUBIT[0] @shared_cbit_array[1] (slice_idx=0)
    qumeasz QUBIT[0] @shared_cbit_array[2] (slice_idx=0)
    qurotxy QUBIT[1], 1.570796e+00, 4.712389e+00 (slice_idx=0)
    quephase QUBIT[0], QUBIT[1], 3.141593e+00 (slice_idx=0)
    qurotxy QUBIT[1], 1.570796e+00, 4.712389e+00 (slice_idx=0)
    qurotxy QUBIT[2], 1.570796e+00, 4.712389e+00 (slice_idx=0)
    quephase QUBIT[1], QUBIT[2], 3.141593e+00 (slice_idx=0)
    qurotxy QUBIT[0], 3.141593e+00, 1.570796e+00 (slice_idx=0)
    qurotxy QUBIT[0], 3.141593e+00, 0.000000e+00 (slice_idx=0)
    qurotxy QUBIT[1], 3.141593e+00, 1.570796e+00 (slice_idx=0)
    qurotxy QUBIT[2], 1.570796e+00, 1.570796e+00 (slice_idx=0)
    qurotxy QUBIT[2], 3.141593e+00, 0.000000e+00 (slice_idx=2)
    return
.Lfunc_end0:
```

Figure 16:
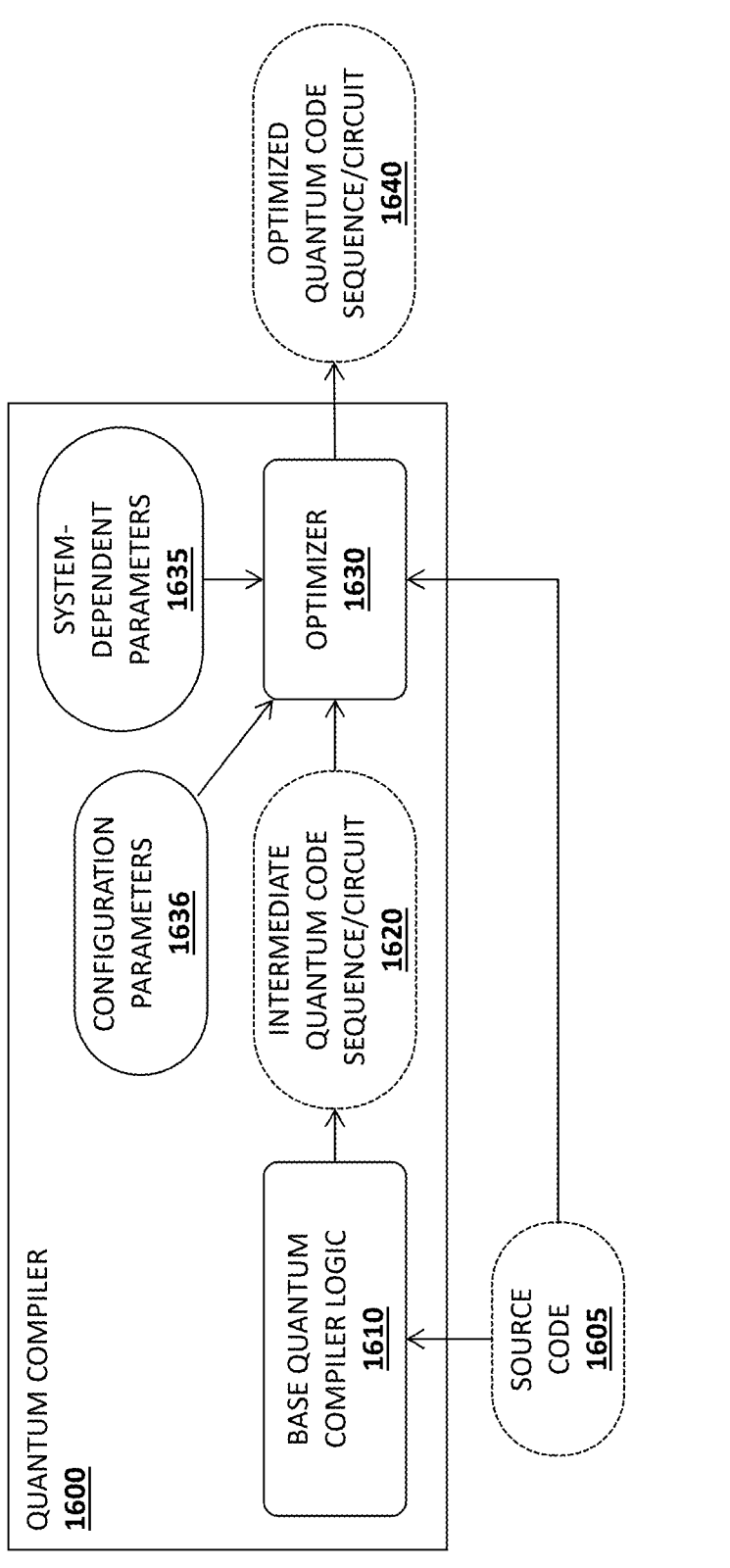
FIG. 16 illustrates one embodiment of a quantum compiler configured to perform optimizations.

FIG. 16 illustrates one embodiment of an optimized quantum compiler 1600 in accordance with some embodiments of the invention. In this embodiment, base quantum compiler logic 1610 generates an intermediate (e.g., unoptimized) quantum code sequence/circuit 1620 based on input source code 1605. In the specific example provided above, the source code 1605 specifies the quantum algorithm which performs generation and measurement of a 3-qubit GHZ state from which the base quantum compiler logic 1601 generates the intermediate quantum code sequence/circuit 1620.

In one embodiment, an optimizer 1630 evaluates the intermediate quantum code sequence/circuit 1620 in accordance with system-dependent parameters 1635 to determine optimization techniques which can be applied to the unoptimized quantum code sequence/circuit 1620 to generate an optimized quantum code sequence/circuit 1640 (e.g., the quantum code sequence with optimization described above).

Some embodiments of the quantum compiler 1600 provide support for source code 1605 in which a user can indicate that the coherent operations after measurement are unnecessary. In the source code below, this is done with a call to the built-in function, "release_quantum_state", highlighted in the quantum code sequence which follows.

```
    Source Code Sequence With Release Quantum State Function:
quantum_kernel void GHZ( ) {
    for (int i = 0; i < MAX_NUM_QUBITS; ++i)
```

-continued

```
    PrepZ(QuReg[i]);
    H(QuReg[0]);
    for (int i = 0; i < (MAX_NUM_QUBITS – 1); ++i)
        CNOT(QuReg[i], QuReg[i + 1]);
    for (int i = 0; i < MAX_NUM_QUBITS; ++i)
        MeasZ(QuReg[i], CReg[i]);
    release_quantum_state( );
}
    Resulting Quantum Code Sequence:
"_Z12GHZ( ).QBB.0.v.stub":         // @"_Z12GHZ( ).QBB.0.v.stub"
// %bb.0:                          // %aqcc.quantum
    quprep QUBIT[0] (slice_idx=1)
    qurotxy QUBIT[0], 1.570796e+00, 4.712389e+00 (slice_idx=0)
    qumeasz QUBIT[0] @shared_cbit_array[0] (slice_idx=2)
    return
.Lfunc_end0:
```

This provides an example in which the compiler 1600 automatically generates classical commands to set two of the classical bits (bits 1 & 2 in the shared_cbit_array) to that of the classical bit which is measured (0 in the shared_cbit_array), thus avoiding all operations on two of the three qubits.

Figure 17:
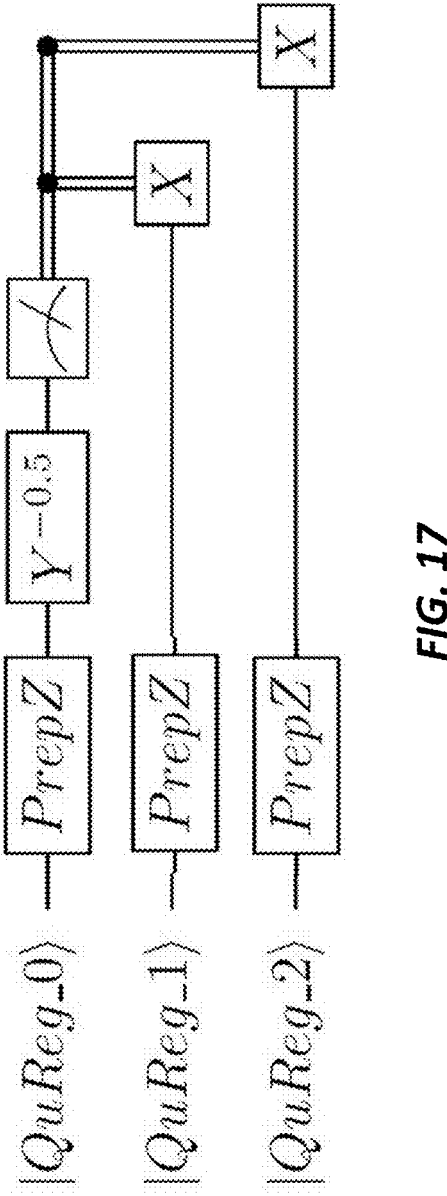
FIG. 17 illustrates another example of an optimized output quantum circuit representation.

One downside to the above optimization is that it was only possible by discarding the coherence of the quantum system. If coherence needs to be maintained, this can be specified via user-programmable configuration parameters 1636. In one embodiment, the optimizer 1630 (in accordance with the configuration parameters 1636) then combines the above result with a further leveraging of classical resources via classically-controlled operations on the other two qubits. A representation of the possible outcome is illustrated in FIG. 17. This will result in the equivalent final state of the system while drastically reducing the number of quantum operations necessary for this subroutine, even removing all two-qubit interactions in the illustrated circuit.

The above example demonstrates the transformation of quantumly-controlled operations to classically conditioned operations. However, it is conceivable that the opposite might be preferred in some cases. For example, if the user inputs code equivalent to FIG. 17 without any awareness of the specifications of the quantum hardware, it is possible that the quantum circuit in FIG. 15 is, in fact, the more optimal implementation as it does not require the measurement outcome be known to achieve the desired quantum state. For example, if the classical conditioning of operations is performed by a processor (e.g., a CPU) lying outside the refrigeration boundary of the quantum processor, there may be a considerable latency of communication between the processor and the quantum system, making FIG. 15 a more optimized choice. Consequently, the "optimal" quantum circuit may be entirely system dependent.

Figure 15:
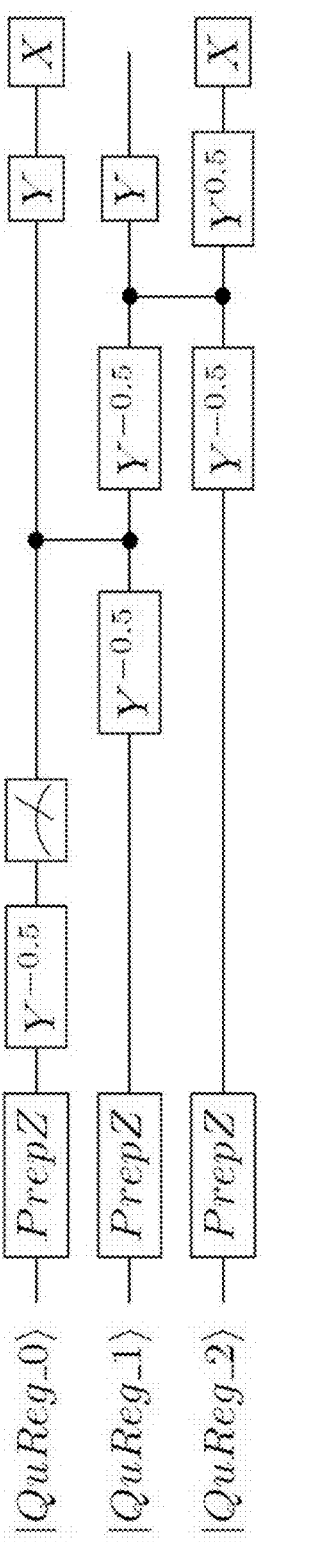
FIG. 15 illustrates an example of an optimized output quantum circuit representation.

To address this issue, in one embodiment, a set of parameters 1635 characterizing the quantum system are provided to the optimizer 1630, which can then make optimization decisions in view of the overall system architecture (e.g., selecting between FIG. 15 and FIG. 17 in the specific example described above). The system-dependent parameters 1635 may initially be estimates based on known characteristics of the quantum system and continually updated during operation. By way of example, and not limitation, the system-dependent variables 1635 may include data indicating the characteristics of the qubits in the quantum processor such as the number of qubits used at any one time, the maximum overall runtime for a single coherent run, the overall logical fidelity of the quantum state or quantum measurement outcomes, and the maximum number of quantum operations performed in a single coherent run.

The system-dependent parameters 1635 may also include data related to interactions between the quantum processor and the classical computing device (e.g., the classical-quantum latency in the above example) and other characteristics associated with the classical resources such as the total runtime of the classical system for the entire hybrid program, the latency times for communication between the classical and quantum systems, the overall size of the compiled binary program, the time required for program compilation, the number of compute nodes, parallelized processor cores, and/or the amount of memory needed for compilation.

B. Conditional Quantum Circuit Selection

In the following example, a subroutine is considered which measures a single Pauli operator string on N qubits (tensor product of N single qubit Pauli operators). Such a string can be measured by conditionally measuring each qubit simultaneously, where a single-qubit change-of-basis operation is used to select the appropriate single-qubit Pauli operator and the desired outcome is the parity over all measurement outcomes.

Figure 18:
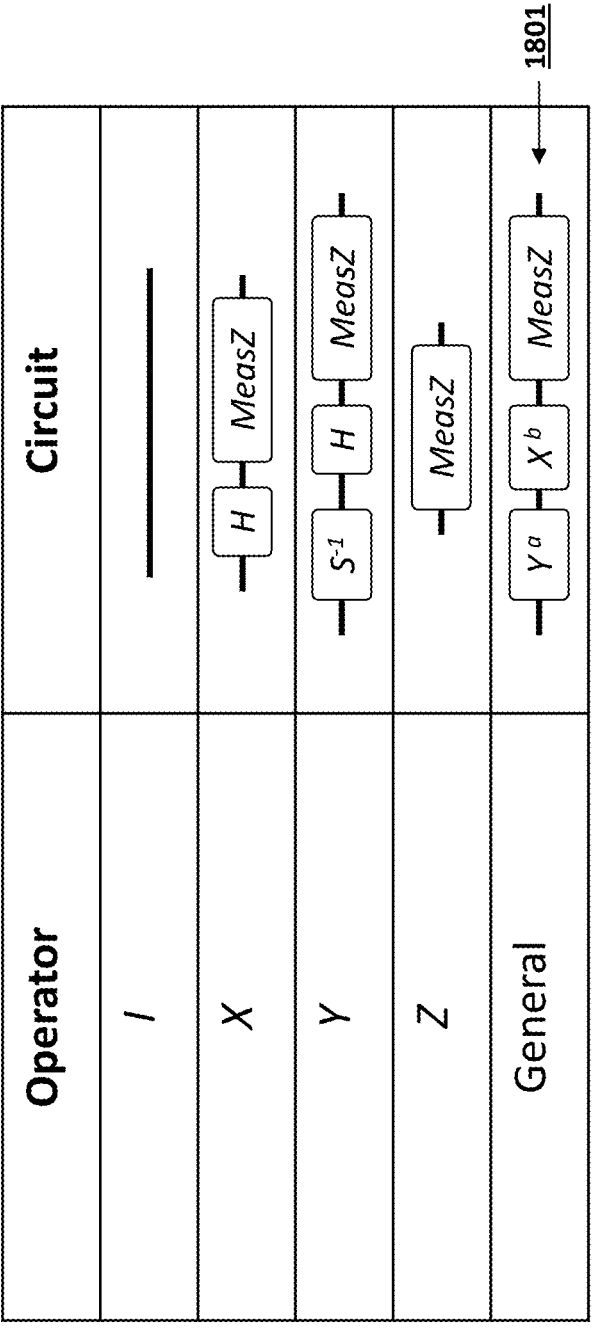
FIG. 18 illustrates an example set of quantum operators and corresponding quantum circuits.

There are four possibilities for each qubit, as shown in the table in FIG. 18, implying $4^N$ possible circuits. If the user wants the Pauli string to be selected at runtime, then one embodiment of the compiler 1600 generates the optimal quantum circuit for all cases by combinatorically generating all $4^N$ possible circuits and performing a selection over those possibilities at runtime. This quickly becomes intractable as the binary size grows exponentially, but could be the best option with smaller values of N. One embodiment of the compiler 1600 allows runtime selection of a change of basis to be embedded into dynamic parameters as shown in the "general" circuit 1801 at the bottom of the table in FIG. 18. In that case, (a, b) are classical dynamic parameters which can be selected at runtime using a single compiled quantum circuit, where (a, b)=(0.5, 0) for X, (a, b)=(0, –0.5) for Y and (a, b)=(0, 0) otherwise. All strings being equal, there is a minor increase in the quantum resource of circuit depth to avoid an exponential explosion in size of the binary and runtime selection. Moreover, the increase in binary size is undesirable starting at some value of N, but may be acceptable at some smaller values of N. Some embodiments of the optimizer 1630 can automate this decision and generalize it based on the capabilities of the system and needs of the user (e.g., specified in system-dependent parameters 1635 and configuration parameters 1636, respectively).

A method in accordance with embodiments of the invention is illustrated in FIG. 19. The method may be implemented on the various quantum and classical system architectures described above, but is not limited to any particular system or processor architecture.

At 1901, an intermediate (non-optimized) quantum circuit representation is generated based on hybrid quantum-classical source code provided by a user. As described above, the intermediate quantum circuit representation may comprise a particular sequence of quantum operations (e.g., qubit initializations, rotations, measurements, etc).

At 1902, the intermediate quantum circuit representation is analyzed based on specified system-dependent parameters and/or configuration parameters. In one embodiment, the system-dependent parameters include information associated with characteristics of the quantum computing component and/or the classical computing component of the quantum system and the configuration parameters indicate user requirements for the quantum algorithm.

At 1903, if potential optimizations are not available, based on the analysis, then the intermediate quantum circuit representation is used. If potential optimizations are available based on the analysis, then at 1904, an optimized quantum circuit representation is automatically generated. At 1905, the optimized quantum circuit representation is run on the quantum system.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1. A machine-readable medium having program code stored thereon which, when executed by a machine, implements a plurality of functional components of a quantum compiler, comprising: quantum compiler logic to generate an intermediate quantum circuit representation based on hybrid quantum-classical source code designed for a hybrid quantum-classical system comprising a quantum computing component and a classical computing component; and optimization logic to analyze the intermediate quantum circuit representation and generate an optimized quantum circuit representation based, at least partly, on system-dependent parameters and configuration parameters, the system-dependent parameters associated with characteristics of the quantum computing component and the classical computing component and the configuration parameters to indicate user requirements.

Example 2. The machine-readable medium of example 1 wherein the hybrid quantum-classical system comprises a hybrid quantum computing stack comprising classical computing resources and quantum computing resources characterized by the system-dependent parameters.

Example 3. The machine-readable medium of examples 1 or 2 wherein the optimization logic is to generate the optimized quantum circuit representation through modifications of one or more of the classical computing resources and one or more of the quantum computing resources in accordance with the system-dependent parameters and the configuration parameters.

Example 4. The machine-readable medium of any of examples 1-3 wherein the modifications comprise tradeoffs in which at least one quantum computing resource or operation is modified based on changes to at least one classical computing resource or operation and/or in which at least one classical computing resource or operation is modified based on changes to at least one quantum computing resource or operation.

Example 5. The machine-readable medium of any of examples 1-4 wherein the system-dependent parameters related to quantum computing resources include at least one of: a number of qubits used at any one time, a maximum overall runtime for a single coherent run, a maximum number of quantum operations to be performed in a single coherent run, a total runtime or total number of quantum operations, and an indication of logical fidelity of quantum state or quantum measurement outcomes.

Example 6. The machine-readable medium of any of examples 1-5 wherein the system-dependent parameters related to classical computing resources include at least one of: a total runtime, latency times for communication between the classical computing component and quantum computing component, a size of a compiled binary for the optimized quantum circuit representation, time for program compilation, a number of compute nodes or parallelized processor cores, and an amount of memory needed for compilation.

Example 7. The machine-readable medium of any of examples 1-6 wherein the user requirements indicated by the configuration parameters include a desired state of the quantum computing component after the optimized quantum circuit representation has been implemented.

Example 8. The machine-readable medium of any of examples 1-7 wherein at least some configuration parameters are specified by a user in the hybrid quantum-classical source code.

Example 9. The machine-readable medium of any of examples 1-8 wherein the intermediate quantum circuit representation comprises a first sequence of quantum operations and the optimized quantum circuit representation comprises a second sequence of quantum operations different from the first sequence of quantum operations.

Example 10. The machine-readable medium of any of examples 1-9 wherein the second sequence of quantum operations comprises a reordering of one or more quantum measurement operations of the first sequence of quantum operations.

Example 11. A method comprising: generating an intermediate quantum circuit representation based on hybrid quantum-classical source code designed for a hybrid quantum-classical system comprising a quantum computing component and a classical computing component; and automatically analyzing the intermediate quantum circuit representation to identify optimizations based, at least partly, on system-dependent parameters and configuration parameters, the system-dependent parameters associated with characteristics of the quantum computing component and the classical computing component and the configuration parameters to indicate user requirements; and generating, based on automatically analyzing, an optimized quantum circuit representation.

Example 12. The method of example 11 wherein the hybrid quantum-classical system comprises a hybrid quantum computing stack comprising classical computing resources and quantum computing resources characterized by the system-dependent parameters.

Example 13. The method of examples 11 or 12 wherein the optimized quantum circuit representation is to be generated through modifications of one or more of the classical computing resources and one or more of the quantum computing resources in accordance with the system-dependent parameters and the configuration parameters.

Example 14. The method of any of examples 11-13 wherein the modifications comprise tradeoffs in which at least one quantum computing resource or operation is modified based on changes to at least one classical computing resource or operation and/or in which at least one classical computing resource or operation is modified based on changes to at least one quantum computing resource or operation.

Example 15. The method of any of examples 11-14 wherein the system-dependent parameters related to quantum computing resources include at least one of: a number of qubits used at any one time, a maximum overall runtime for a single coherent run, a maximum number of quantum operations to be performed in a single coherent run, a total runtime or total number of quantum operations, and an indication of logical fidelity of quantum state or quantum measurement outcomes.

Example 16. The method of any of examples 11-15 wherein the system-dependent parameters related to classical computing resources include at least one of: a total runtime, latency times for communication between the classical computing component and quantum computing component, a size of a compiled binary for the optimized quantum circuit representation, time for program compilation, a number of compute nodes or parallelized processor cores, and an amount of memory needed for compilation.

Example 17. The method of any of examples 11-16 wherein the user requirements indicated by the configuration parameters include a desired state of the quantum computing component after the optimized quantum circuit representation has been implemented.

Example 18. The method of any of examples 11-17 wherein at least some configuration parameters are specified by a user in the hybrid quantum-classical source code.

Example 19. The method of any of examples 11-18 wherein the intermediate quantum circuit representation comprises a first sequence of quantum operations and the optimized quantum circuit representation comprises a second sequence of quantum operations different from the first sequence of quantum operations.

Example 20. The method of any of examples 11-19 wherein the second sequence of quantum operations comprises a reordering of one or more quantum measurement operations of the first sequence of quantum operations.

Example 21. An apparatus comprising: a memory to store program code; and a processor to process the program code to implement a plurality of functional components of a quantum compiler, comprising: quantum compiler logic to generate an intermediate quantum circuit representation based on hybrid quantum-classical source code designed for a hybrid quantum-classical system comprising a quantum computing component and a classical computing component; and optimization logic to analyze the intermediate quantum circuit representation and generate an optimized quantum circuit representation based, at least partly, on system-dependent parameters and configuration parameters, the system-dependent parameters associated with characteristics of the quantum computing component and the classical computing component and the configuration parameters to indicate user requirements.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals-such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A non-transitory machine-readable medium having program code stored thereon which, when executed by a machine, implements a plurality of functional components of a quantum compiler, comprising:

quantum compiler logic to generate an intermediate quantum circuit representation based on hybrid quantum-classical source code designed for a hybrid quantum-classical system comprising a quantum computing component and a classical computing component; and optimization logic to analyze the intermediate quantum circuit representation and generate an optimized quantum circuit representation based, at least partly, on system-dependent parameters and configuration parameters, the system-dependent parameters associated with characteristics of the quantum computing component and the classical computing component, the configuration parameters to indicate user requirements to generate the optimized quantum circuit representation including whether coherence of the quantum computing component is to be maintained, and wherein the optimized quantum circuit representation is used to implement an optimized quantum circuit.

2. The non-transitory machine-readable medium of claim 1 wherein the hybrid quantum-classical system comprises a hybrid quantum computing stack comprising classical computing resources and quantum computing resources characterized by the system-dependent parameters.

3. The non-transitory machine-readable medium of claim 2 wherein the optimization logic is to generate the optimized quantum circuit representation through modifications of one or more of the classical computing resources and one or more of the quantum computing resources in accordance with the system-dependent parameters and the configuration parameters.

4. The non-transitory machine-readable medium of claim 3 wherein the modifications comprise tradeoffs in which at least one quantum computing resource or operation is modified based on changes to at least one classical computing resource or operation and/or in which at least one classical computing resource or operation is modified based on changes to at least one quantum computing resource or operation.

5. The non-transitory machine-readable medium of claim 2 wherein the system-dependent parameters related to quantum computing resources include at least one of: a number of qubits used at any one time, a maximum overall runtime for a single coherent run, a maximum number of quantum operations to be performed in a single coherent run, a total runtime or total number of quantum operations, and an indication of logical fidelity of quantum state or quantum measurement outcomes.

6. The non-transitory machine-readable medium of claim 2 wherein the system-dependent parameters related to classical computing resources include at least one of: a total runtime, latency times for communication between the classical computing component and quantum computing component, a size of a compiled binary for the optimized quantum circuit representation, time for program compilation, a number of compute nodes or parallelized processor cores, and an amount of memory needed for compilation.

7. The non-transitory machine-readable medium of claim 1 wherein the user requirements indicated by the configuration parameters include a desired state of the quantum computing component after the optimized quantum circuit representation has been implemented.

8. The non-transitory machine-readable medium of claim 7 wherein at least some configuration parameters are specified by a user in the hybrid quantum-classical source code.

9. The non-transitory machine-readable medium of claim 1 wherein the intermediate quantum circuit representation comprises a first sequence of quantum operations and the optimized quantum circuit representation comprises a second sequence of quantum operations different from the first sequence of quantum operations.

10. The non-transitory machine-readable medium of claim 9 wherein the second sequence of quantum operations comprises a reordering of one or more quantum measurement operations of the first sequence of quantum operations.

11. A method comprising:

generating an intermediate quantum circuit representation based on hybrid quantum-classical source code designed for a hybrid quantum-classical system comprising a quantum computing component and a classical computing component;

automatically analyzing the intermediate quantum circuit representation to identify optimizations based, at least partly, on system-dependent parameters and configuration parameters, the system-dependent parameters associated with characteristics of the quantum computing component and the classical computing component, and the configuration parameters to indicate user requirements to generate an optimized quantum circuit representation including whether coherence of the quantum computing component is to be maintained;

generating, based on automatically analyzing the intermediate quantum circuit representation, the optimized quantum circuit representation; and using the optimized quantum circuit representation to implement an optimized quantum circuit.

12. The method of claim 11 wherein the hybrid quantum-classical system comprises a hybrid quantum computing stack comprising classical computing resources and quantum computing resources characterized by the system-dependent parameters.

13. The method of claim 12 wherein the optimized quantum circuit representation is to be generated through modifications of one or more of the classical computing resources and one or more of the quantum computing resources in accordance with the system-dependent parameters and the configuration parameters.

14. The method of claim 13 wherein the modifications comprise tradeoffs in which at least one quantum computing resource or operation is modified based on changes to at least one classical computing resource or operation and/or in which at least one classical computing resource or operation is modified based on changes to at least one quantum computing resource or operation.

15. The method of claim 12 wherein the system-dependent parameters related to quantum computing resources include at least one of: a number of qubits used at any one time, a maximum overall runtime for a single coherent run, a maximum number of quantum operations to be performed in a single coherent run, a total runtime or total number of quantum operations, and an indication of logical fidelity of quantum state or quantum measurement outcomes.

16. The method of claim 12 wherein the system-dependent parameters related to classical computing resources include at least one of: a total runtime, latency times for communication between the classical computing component and quantum computing component, a size of a compiled binary for the optimized quantum circuit representation, time for program compilation, a number of compute nodes or parallelized processor cores, and an amount of memory needed for compilation.

17. The method of claim 11 wherein the user requirements indicated by the configuration parameters include a desired state of the quantum computing component after the optimized quantum circuit representation has been implemented.

18. The method of claim 17 wherein at least some configuration parameters are specified by a user in the hybrid quantum-classical source code.

19. The method of claim 11 wherein the intermediate quantum circuit representation comprises a first sequence of quantum operations and the optimized quantum circuit representation comprises a second sequence of quantum operations different from the first sequence of quantum operations.

20. The method of claim 19 wherein the second sequence of quantum operations comprises a reordering of one or more quantum measurement operations of the first sequence of quantum operations.

21. An apparatus comprising:

a memory to store program code; and a processor to process the program code to implement a plurality of functional components of a quantum compiler, comprising:

quantum compiler logic to generate an intermediate quantum circuit representation based on hybrid quantum-classical source code designed for a hybrid quantum-classical system comprising a quantum computing component and a classical computing component; and optimization logic to analyze the intermediate quantum circuit representation and generate an optimized quantum circuit representation based, at least partly, on system-dependent parameters and configuration parameters, the system-dependent parameters associated with characteristics of the quantum computing component and the classical computing component, the configuration parameters to indicate user requirements to generate the optimized quantum circuit representation including whether coherence of the quantum computing component is to be maintained, and wherein the optimized quantum circuit representation is used to implement an optimized quantum circuit.

* * * * *